(12) United States Patent
Tanaka et al.

(10) Patent No.: US 10,953,839 B2
(45) Date of Patent: Mar. 23, 2021

(54) AIRBAG DEVICE HAVING CONTROLLED EXHAUST HOLE

(71) Applicant: TOYODA GOSEI CO., LTD., Kiyosu (JP)

(72) Inventors: Motoyuki Tanaka, Kiyosu (JP); Takuya Hiraiwa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 79 days.

(21) Appl. No.: 16/358,826

(22) Filed: Mar. 20, 2019

(65) Prior Publication Data
US 2019/0299913 A1 Oct. 3, 2019

(30) Foreign Application Priority Data

Mar. 29, 2018 (JP) .............................. JP2018-064850

(51) Int. Cl.
| | | |
|---|---|---|
| *B60R 21/2338* | (2011.01) | |
| *B60R 21/233* | (2006.01) | |
| *B60R 21/205* | (2011.01) | |
| *B60R 21/239* | (2006.01) | |
| *B60R 21/16* | (2006.01) | |

(52) U.S. Cl.
CPC ........ *B60R 21/2338* (2013.01); *B60R 21/205* (2013.01); *B60R 21/233* (2013.01); *B60R 21/239* (2013.01); *B60R 2021/161* (2013.01); *B60R 2021/2395* (2013.01);
(Continued)

(58) Field of Classification Search
CPC .... B60R 2021/161; B60R 2021/23308; B60R 2021/23382; B60R 2021/23384; B60R 2021/2395; B60R 21/205; B60R 21/233; B60R 21/2338; B60R 21/239
See application file for complete search history.

(56) References Cited

U.S. PATENT DOCUMENTS

| | | | | |
|---|---|---|---|---|
| 6,648,371 | B2 * | 11/2003 | Vendely ................ | B60R 21/217 280/739 |
| 7,413,218 | B2 * | 8/2008 | Ekdahl .................. | B60R 21/239 280/736 |

(Continued)

FOREIGN PATENT DOCUMENTS

| | | |
|---|---|---|
| JP | 3626529 B2 | 10/1996 |
| JP | H09-323604 A | 12/1997 |

(Continued)

*Primary Examiner* — Laura Freedman
(74) *Attorney, Agent, or Firm* — Posz Law Group, PLC

(57) ABSTRACT

An airbag device includes: an airbag having an exhaust hole capable of discharging a part of the inflation gas introduced therein upon opening; and an opening/closing control device capable of controlling opening/closing of the exhaust hole. The airbag has: a flexible bag main body; a discharge part having the exhaust hole; and a coupling member. Peripheral edges of a pair of peripheral wall constituting parts are joined to form the bag main body and the discharge part. Discharge part forming portions, which constitute the discharge part, partially protrude in the peripheral wall constituting parts, respectively. An opening, which constitutes the exhaust hole, is formed in a region, which is closer to a tip end-side of the discharge part than seal parts crimped to each other when the discharge part is pulled into the bag main body.

9 Claims, 16 Drawing Sheets

(52) U.S. Cl.
CPC ............ *B60R 2021/23308* (2013.01); *B60R 2021/23382* (2013.01); *B60R 2021/23384* (2013.01)

(56) References Cited

U.S. PATENT DOCUMENTS

| | | | | |
|---|---|---|---|---|
| 7,600,782 B2* | 10/2009 | Ishiguro | ................ | B60R 21/239 280/739 |
| 7,651,130 B2* | 1/2010 | Bauberger | ............ | B60R 21/239 280/743.2 |
| 7,841,623 B2* | 11/2010 | Ito | ....................... | B60R 21/2338 280/743.2 |
| 7,883,110 B2* | 2/2011 | Pausch | .................. | B60R 21/239 280/739 |
| 7,938,444 B2* | 5/2011 | Williams | ............ | B60R 21/2338 280/743.2 |
| 7,946,618 B2* | 5/2011 | Fukawatase | .......... | B60R 21/239 280/739 |
| 8,322,748 B2* | 12/2012 | Abe | ..................... | B60R 21/239 280/739 |
| 8,388,021 B2* | 3/2013 | Mitsuo | .................. | B60R 21/239 280/743.2 |
| 8,408,585 B2* | 4/2013 | Paxton | ................ | B60R 21/2338 280/728.2 |
| 8,608,197 B2* | 12/2013 | Eckert | .................. | B60R 21/239 280/739 |
| 8,646,808 B2* | 2/2014 | Williams | .............. | B60R 21/239 280/743.2 |
| 8,777,260 B2* | 7/2014 | Kranzle | .............. | B60R 21/2338 280/740 |
| 8,864,170 B2* | 10/2014 | Yamada | .............. | B60R 21/2338 280/743.2 |
| 8,955,878 B2* | 2/2015 | Jang | ....................... | B60R 21/239 280/736 |
| 9,022,424 B2* | 5/2015 | Nakamura | .......... | B60R 21/2338 280/743.2 |
| 9,376,086 B2* | 6/2016 | Nebel | .................... | B60R 21/239 |
| 9,434,346 B2* | 9/2016 | Weber | ................. | B60R 21/2165 |
| 10,131,315 B2* | 11/2018 | Haas, Jr. | ............... | B60R 21/235 |
| 2008/0211214 A1 | 9/2008 | Ishiguro et al. | | |
| 2009/0224520 A1 | 9/2009 | Higuchi | | |
| 2010/0001495 A1 | 1/2010 | Sekino et al. | | |
| 2011/0193329 A1 | 8/2011 | Higuchi | | |
| 2011/0309605 A1* | 12/2011 | Kumagai | ............ | B60R 21/239 280/741 |
| 2020/0094768 A1* | 3/2020 | Hiraiwa | .............. | B60R 21/2338 |
| 2020/0156583 A1* | 5/2020 | Yamada | .............. | B60R 21/2338 |

FOREIGN PATENT DOCUMENTS

| | | |
|---|---|---|
| JP | 4024118 B2 | 4/2004 |
| JP | 2008-149940 A | 7/2008 |
| JP | 2008-179231 A | 8/2008 |
| JP | 4840157 B2 | 8/2008 |
| JP | 4659090 B2 | 10/2009 |
| JP | 2012-171408 A | 9/2012 |
| WO | 2010/082386 A1 | 7/2010 |

* cited by examiner

AIRBAG DEVICE HAVING CONTROLLED EXHAUST HOLE

CROSS-REFERENCE TO RELATED APPLICATIONS

This application is based upon and claims the benefit of priority from prior Japanese patent application No. 2018-064850, filed on Mar. 29, 2018, the entire contents of which are incorporated herein by reference.

TECHNICAL FIELD

The present invention relates to an airbag device having an airbag accommodated with being folded in an accommodation part, configured to inflate with protruding from the accommodation part by allowing an inflation gas to flow into the airbag, and capable of controlling an internal pressure thereof upon completion of the inflation.

BACKGROUND ART

In the related art, an airbag device including an airbag, which is provided with an exhaust hole for discharging a part of an inflation gas, and configured to control opening/closing of the exhaust hole by an opening/closing control device, in correspondence to a sitting position and a physique of a passenger sitting on a seat, and to control an internal pressure upon inflation of the airbag is available (for example, Patent Document 1). Specifically, according to the airbag device of the related art, the airbag has a bag main body, and a coupling member provided to the bag main body and configured to couple a discharge part having the exhaust hole to the opening/closing control device, and when the bag main body inflates in a state where the coupling of the coupling member with the opening/closing control device is kept, the discharge part is pulled into the bag main body, so that a closed state of the exhaust hole is kept, and when the bag main body inflates in a state where the coupling of the coupling member with the opening/closing control device is released, the pulled state of the discharge part into the bag main body is released, so that the discharge part protrudes to an outside of the bag main body and opens the exhaust hole.

Also, an airbag device including an airbag having a protrusion provided separately from a bag main body is available in which the protrusion is provided with an exhaust hole having a substantially circular shape, a coupling member extending from a tip end-side of the protrusion is coupled to an opening/closing control device, and opening/closing of the exhaust hole is controlled and an internal pressure upon inflation of the airbag is controlled by keeping or releasing the coupling of the coupling member with the opening/closing control device (for example, refer to Patent Document 2).

Patent Document 1: Japanese Patent No. 4,840,157
Patent Document 2: JP-A-2012-171408

However, according to the airbag device disclosed in Patent Document 1, the exhaust hole formed in the discharge part is formed from a gap part configured as peripheral edges of peripheral wall constituting parts constituting the bag main body are not partially coupled. As a result, the exhaust hole has different opening shapes such as a largely widened opening and an opening with a small opening width dimension, so that it is difficult to make an opening area of the exhaust hole constant upon opening and to thus stabilize an exhaust amount of the inflation gas.

Also, according to the airbag device disclosed in Patent Document 2, it is possible to stabilize the exhaust amount of the inflation gas from the exhaust hole opened in a circular shape. However, the exhaust hole is formed in the protrusion provided separately from the bag main body, and the coupling member extending outward from the tip end-side of the protrusion is configured to once pass an inside of the bag main body, to make a tip end thereof protrude to the outside of the bag main body and to couple the same to the opening/closing control device. Therefore, the configuration is not simple, and there is room for improvements on reductions in the manufacturing man-hours and the cost.

The present invention has been made in view of the above situations, and an object thereof is to provide an airbag device having a simple configuration and capable of stabilizing an exhaust amount of an inflation gas upon opening.

SUMMARY OF INVENTION

According to an aspect of the invention, there is provided an airbag device comprising: an airbag accommodated with being folded in an accommodation part, configured to inflate with protruding from the accommodation part by allowing an inflation gas to flow into the airbag, and having an exhaust hole capable of discharging a part of the inflation gas introduced therein upon opening; and an opening/closing control device arranged at a side of the accommodation part and capable of controlling opening/closing of the exhaust hole, wherein the airbag has: a flexible bag main body formed to have a bag shape and having an inflow opening for allowing the inflation gas to flow therein, a peripheral edge of the inflow opening coupled to a side of the accommodation part; a discharge part having the exhaust hole; and a coupling member arranged in the bag main body and having a base part-side coupled to the discharge part and a tip end-side coupled to the opening/closing control device arranged in a vicinity of the inflow opening, the discharge part is configured so that, when the bag main body inflates in a state where a coupling of the coupling member with the opening/closing control device is kept, wall parts around the exhaust hole are crimped to each other, and a closed state of the exhaust hole is thus kept in a state where the discharge part is pulled in the bag main body, and when the bag main body inflates in a state where the coupling of the coupling member with the opening/closing control device is released, a pulled state of the discharge part into the bag main body is released, and the discharge part protrudes from the bag main body to open the exhaust hole, peripheral edges of a pair of peripheral wall constituting parts, which are formed of flexible sheet members and constitute a peripheral wall upon inflation, are joined to form the bag main body and the discharge part, discharge part forming portions, which constitute the discharge part, partially protrude in the peripheral wall constituting parts, respectively, the peripheral wall constituting parts have edge parts for peripheral wall formation and edge parts for discharge part formation formed to continue from the edge parts for peripheral wall formation, respectively, the edge parts for peripheral wall formation are joined to each other, and the edge parts for discharge part formation are joined to each other, and the discharge part has a tip end-side coupled to the coupling member, and an opening, which constitutes the exhaust hole, is formed in a region, which is closer to the tip end-side than seal parts crimped to each other when the discharge part is pulled into the bag main body.

DESCRIPTION OF EMBODIMENTS

Figure 1:
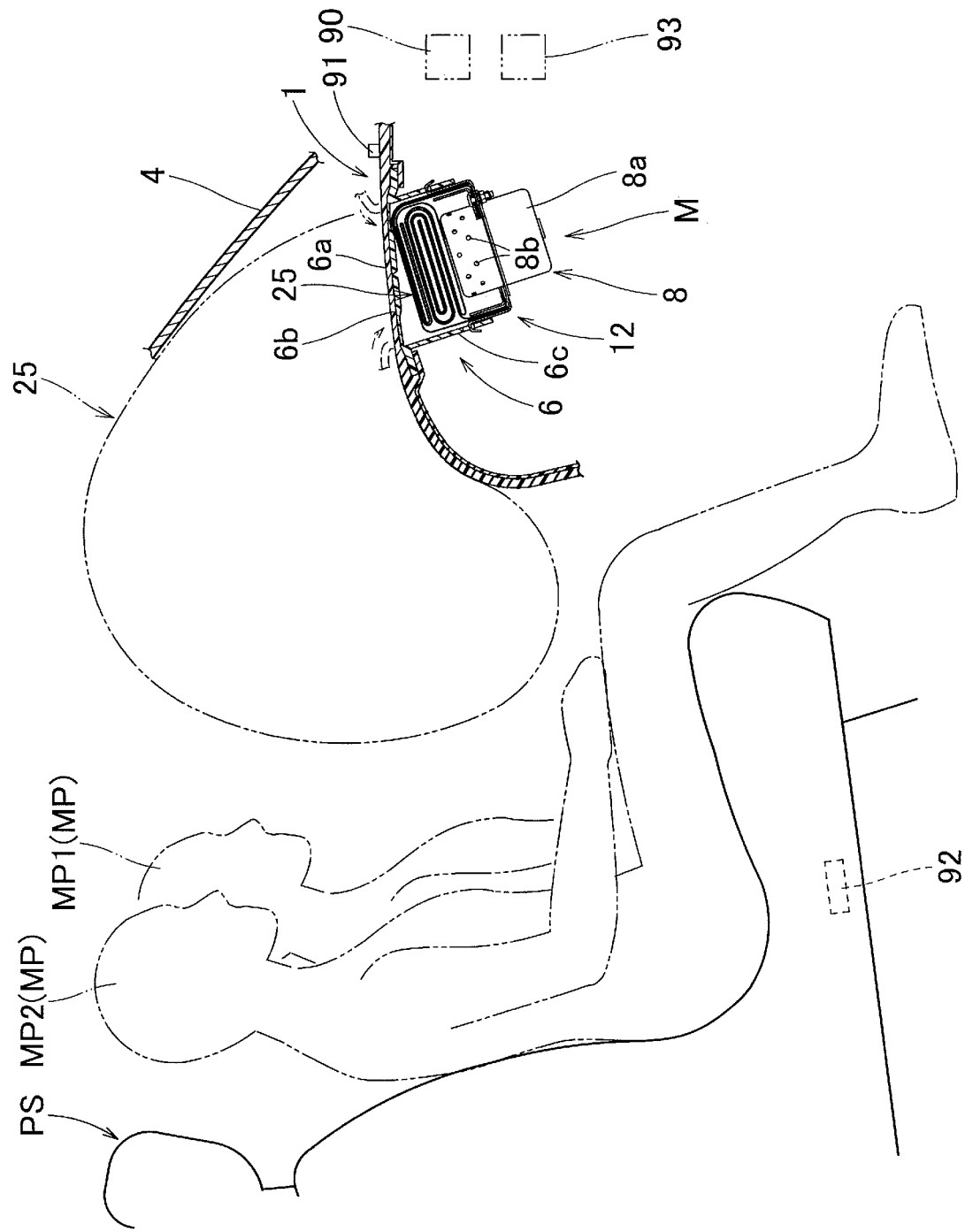
FIG. 1 is a schematic view depicting a vicinity of a part to which an airbag device for a front passenger seat, which is an illustrative embodiment of the present invention, is mounted.
Figure 2:
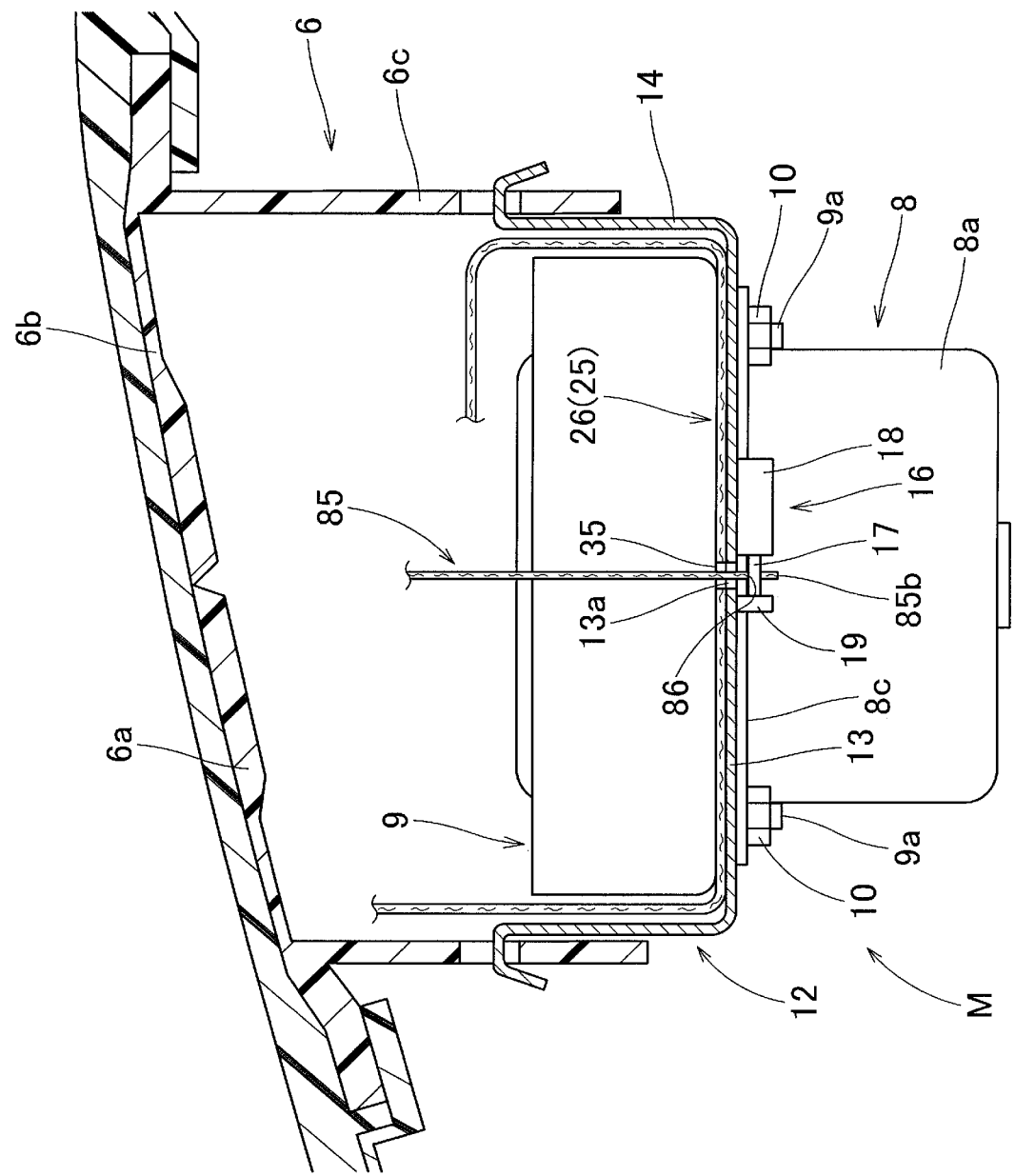
FIG. 2 is a schematic enlarged sectional view of the airbag device of the illustrative embodiment in a front and rear direction.

Hereinafter, an illustrative embodiment of the present invention will be described with reference to the drawings. In the illustrative embodiment, an airbag device M for a front passenger seat (hereinafter, abbreviated as "airbag device") capable of protecting a passenger MP sitting on a front passenger seat PS is exemplified. As shown in FIGS. 1 and 2, the airbag device M of the illustrative embodiment is a top mount type that is arranged in an upper surface 2 of an instrument panel 1 in front of the front passenger seat PS in a vehicle. Meanwhile, in the illustrative embodiment, the front and rear/upper and lower/right and left directions coincide with the front and rear/upper and lower/right and left directions of the vehicle V, unless particularly mentioned.

As shown in FIGS. 1 and 2, the airbag device M includes a folded airbag 25, an inflator 8 configured to supply an inflation gas to the airbag 25, a case 12 as the accommodation part configured to accommodate and hold therein the airbag 25 and the inflator 8, a retainer 9 for attaching the airbag 25 and the inflator 8 to the case 12, an airbag cover 6 configured to cover the folded airbag 25, and an engagement member 16 as the opening/closing control mechanism configured to control opening/closing of an exhaust hole 48 formed in the airbag 25. In the illustrative embodiment, activations of the inflator 8 and the engagement member 16 are controlled by a control device 90 shown in FIG. 1.

As shown in FIG. 1, the control device 90 is configured to activate the inflator 8 and to control the activation of the engagement member 16 so as to inflate the airbag 25 in a favorable inflation mode by inputting electric signals from a position detection sensor 91 capable of detecting a physique of the passenger MP sitting on the front passenger seat PS and a spaced distance between the instrument panel 1 and the passenger MP, a weight detection sensor 92 capable of detecting a weight of the passenger MP, a collision detection sensor 93 capable of detecting an acceleration and an acceleration direction of the vehicle, and the like.

The airbag cover 6 is formed integrally with the instrument panel 1 made of a synthetic resin, and is configured so that two front and rear door parts 6a, 6b are to be pushed and opened by the airbag 25 upon deployment and inflation of the airbag 25. Also, a coupling wall part 6c coupled to the case 12 is formed around the door parts 6a, 6b of the airbag cover 6.

As shown in FIGS. 1 and 2, the inflator 8 has a substantially circular cylinder-shaped main body part 8a having a plurality of gas discharge ports 8b and a flange part 8c for attaching the inflator 8 to the case 12.

The case 12 as the accommodation part is formed to have a substantially cuboid shape made of plate and having a rectangular opening formed at an upper end-side, and has a substantially rectangular bottom wall part 13 to which the inflator 8 is inserted and attached from below, and a peripheral wall part 14 extending upward from an outer peripheral edge of the bottom wall part 13 and configured to engage with the coupling wall part 6c of the airbag cover 6, as shown in FIG. 1. In the illustrative embodiment, the airbag 25 and the inflator 8 are coupled to the bottom wall part 13 of the case 12 by passing each bolt 9a (attaching means) of the retainer 9 arranged in the airbag 25 into a peripheral edge of an inflow opening 33 of the airbag 25, the bottom wall part 13 of the case 12 and the flange part 8c of the inflator 8 and fixing each bolt with a nut 10. Specifically, although not shown in detail, the bottom wall part 13 of the case 12 has a wide width in the right and left direction, and an insertion hole in which the main body part 8a of the inflator 8 can be inserted and an insertion hole in which each bolt 9a of the retainer 9 is to be inserted are arranged at a substantial center of the bottom wall part in the right and left direction. Also, a through-hole 13a in which a tip end 85b-side of a coupling member 85 (which will be described later) can be inserted is formed at the left of the insertion hole, in which the main body part 8a of the inflator 8 is to be inserted, of the bottom wall part 13 (refer to FIG. 2). Also, a bracket (not shown) to be coupled to a body-side of the vehicle is arranged at the bottom wall part 13 of the case 12.

Also, the engagement member 16 as the opening/closing control device is arranged at a lower part of the bottom wall part 13 and in the vicinity of the through-hole 13a. The engagement member 16 is coupled to the tip end 85b-side of the coupling member 85 formed at the airbag 25, and has an engaging pin 17 inserted in an engaging hole 86, which is formed at the tip end 85b-side of the coupling member 85, and engaging with the tip end 85b-side of the coupling member 85, an actuator 18 attached to a lower surface of the bottom wall part 13 and configured to activate so as to pull-in the engaging pin 17, and a support bracket 19 extending downward from the bottom wall part 13 at a tip end-side of the engaging pin 17 and configured to support the tip end-side of the engaging pin 17, as shown in FIG. 2. The actuator 18 is configured to receive an activating signal from the control device 90 and to pull-in the engaging pin 17. When the actuator 18 is activated to pull-in the engaging pin 17, the engaging pin 17 shifts from a state in which it is engaged with the tip end 85b-side of the coupling member 85 to a state in which the engagement is released. As the actuator 18, a piston cylinder configured to use hydraulic pressure/water pressure/pneumatic pressure or fluid pressure includes a case where a gas pressure to inflate is generated such as the inflator and the like, a motor configured to use the fluid pressure and electricity, an electromagnetic solenoid, a spring configured to use an urging force upon restoration, and the like can be used inasmuch as it is possible to move the engaging pin 17 by an electric signal from the control device 90. In the meantime, while the actuator 18 is not activated, the engaging pin 17 is supported at the tip end-side by the support bracket 19 so as to prevent the tip end 85b-side of the coupling member 85 from separating from the engaging pin 17 in the engagement state.

Figure 3:
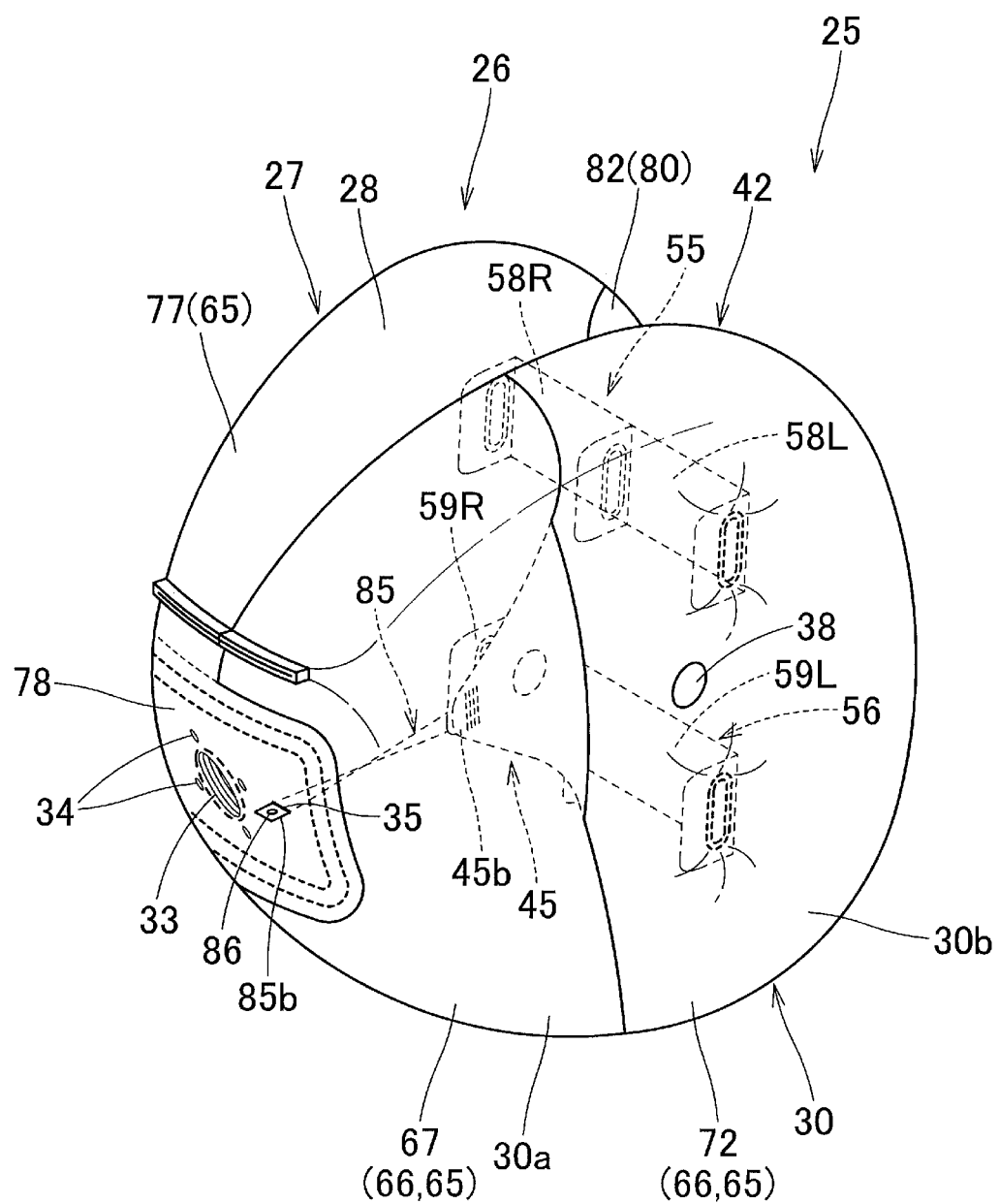
FIG. 3 is a perspective view depicting a state where an airbag, which is used for the airbag device of the illustrative embodiment, is inflated in a single body form.
Figure 4:
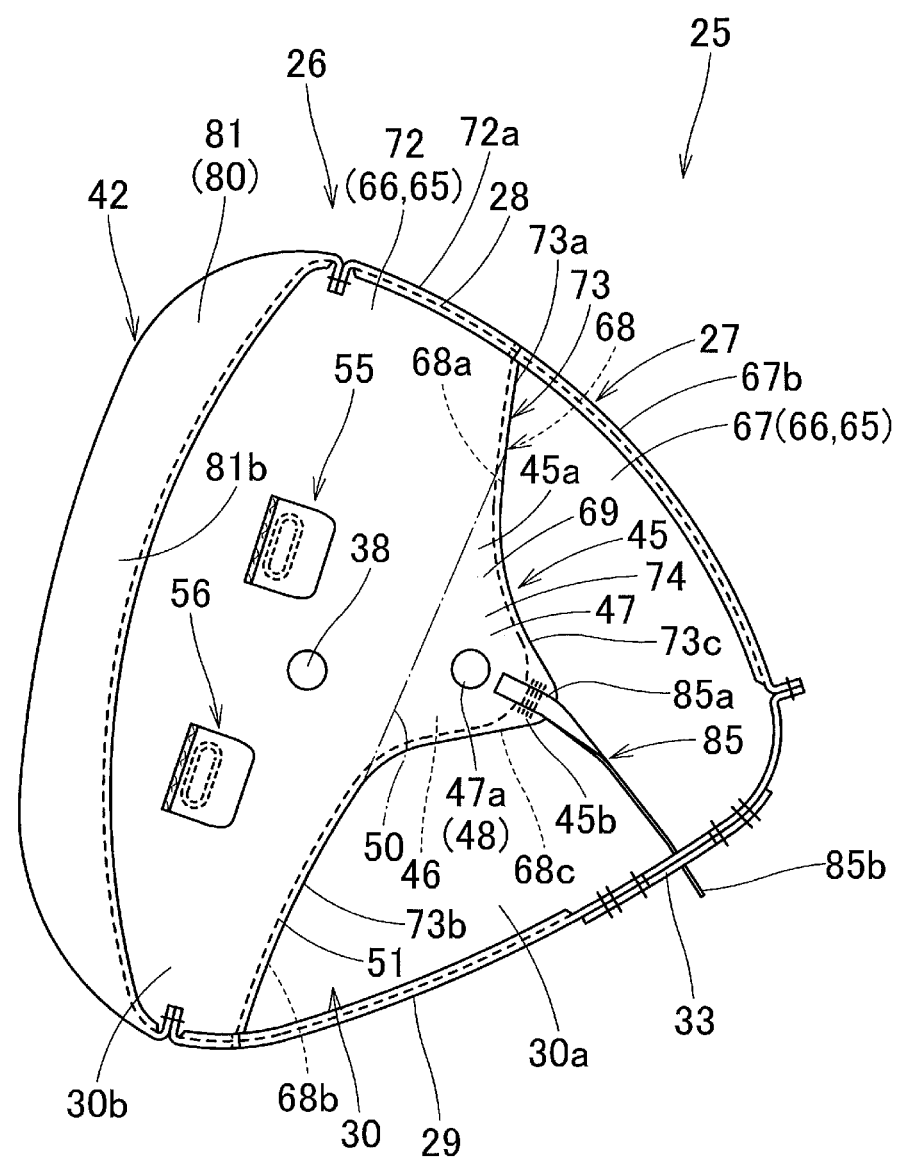
FIG. 4 is a schematic sectional view of the airbag of FIG. 3 taken along a front and rear direction of a vehicle.
Figure 5:
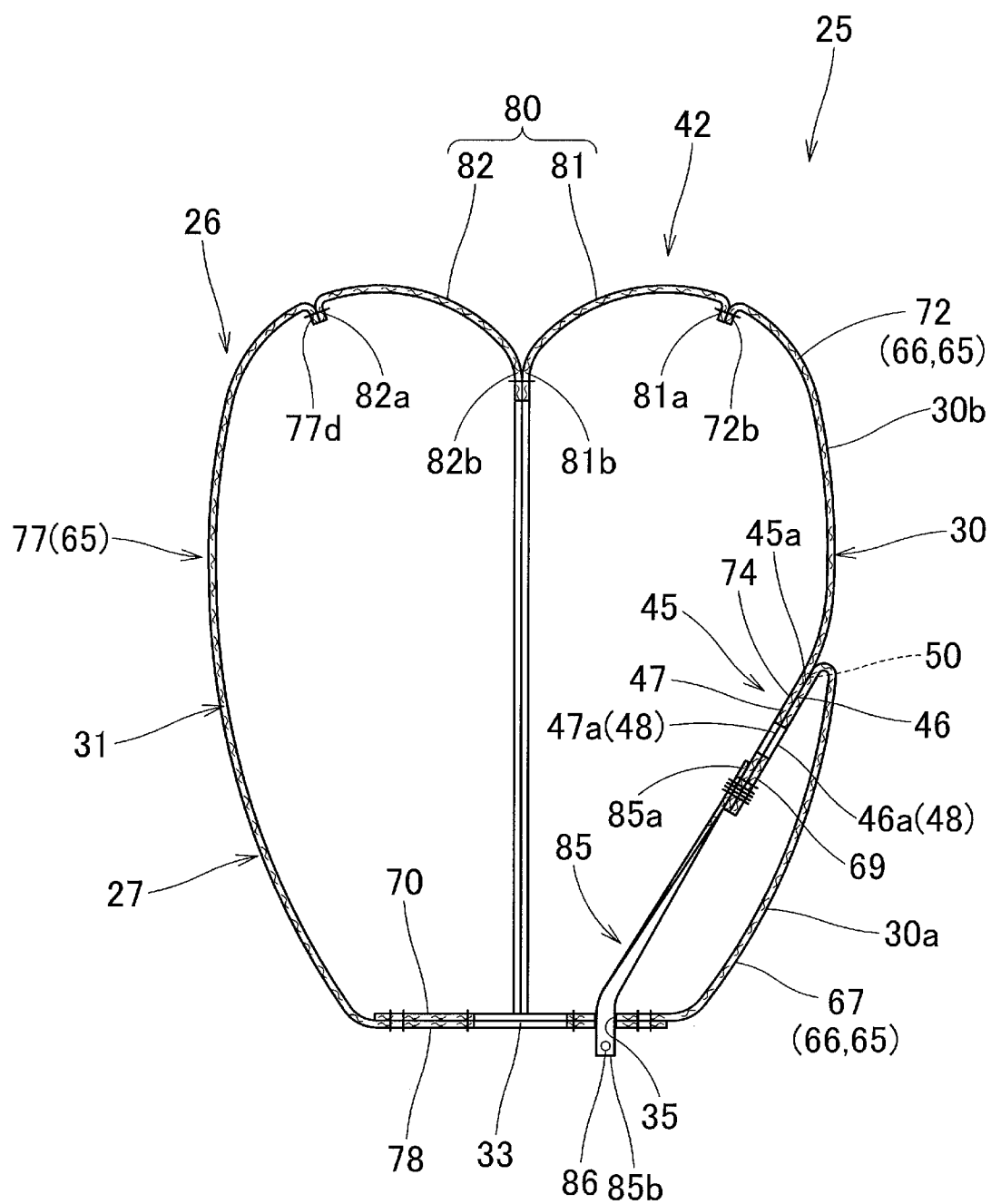
FIG. 5 is a schematic cross sectional view of the airbag of FIG. 3 taken along the front and rear direction of a vehicle.

As shown in FIGS. 3 to 5, the airbag 25 has a bag main body 26, a discharge part 45 having an exhaust hole 48, tethers 55, 56 for restraining an inflation completion shape of the bag main body 26, and a coupling member 85 arranged in the bag main body 26 with a base part 85a-side being coupled to the discharge part 45.

Figure 8:
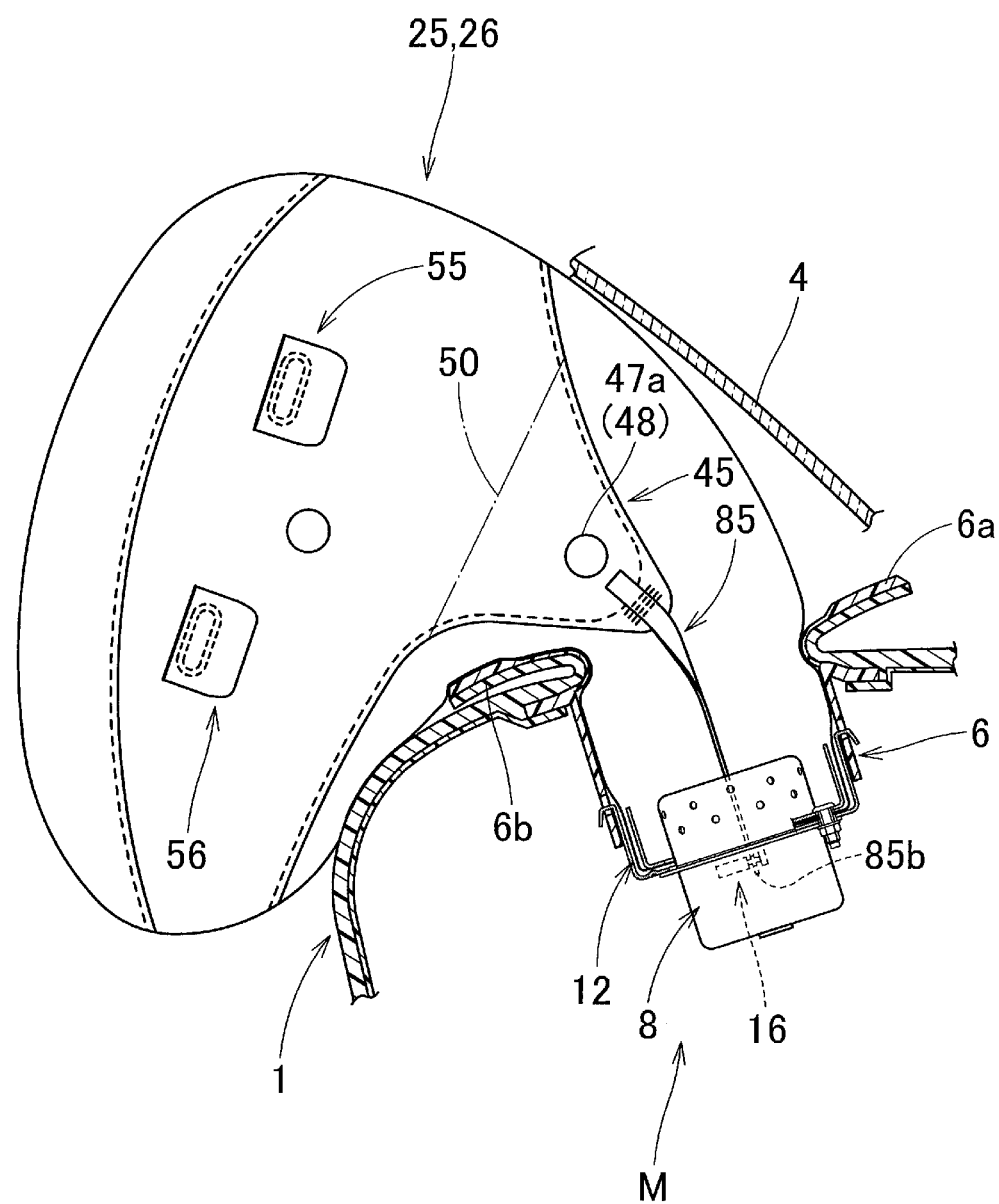
FIG. 8 is a schematic sectional view in the front and rear direction, depicting a state where inflation of the airbag in a close mode is completed in the airbag device of the illustrative embodiment.

As shown with the dashed-two dotted line in FIG. 1 and FIG. 8, in the illustrative embodiment, the bag main body 26 is configured to be arranged between the upper surface 2 of the instrument panel 1 and a windshield 4 above the instrument panel 1 upon completion of the inflation. Specifically, as shown in FIGS. 3 and 4, a shape of the bag main body 26 upon completion of the inflation is a substantial square pyramid of which a top part is arranged at a front end-side, and the bag main body 26 has a passenger-side wall part 42 becoming a passenger MP-side upon completion of the inflation and a peripheral wall part 27 having a tapered shape extending forward from a peripheral edge of the passenger-side wall part 42 and converging toward a front end-side.

The peripheral wall part 27 is a part that is arranged to block a space between the upper surface 2 of the instrument panel 1 and the windshield 4 above the instrument panel 1 upon completion of the inflation of the airbag 25, and has an upper wall part 28 and a lower wall part 29 arranged in the right and left direction at upper and lower sides, and a left wall part 30 and a right wall part 31 arranged in the front and rear direction at left and right sides. In the vicinity of a front end of the lower wall part 29 of the peripheral wall part 27 located in the vicinity of the front end upon completion of the inflation of the bag main body 26, the inflow opening 33 configured to be opened in a substantially circular shape so as to allow the inflation gas to flow into the airbag and having a peripheral edge attached to the bottom wall part 13 of the case 12 is formed at a substantial center in the right and left direction. The peripheral edge of the inflow opening 33 is formed with a plurality of (four, in the illustrative embodiment) attaching holes 34 into which the bolts 9a of the retainer 9 are inserted to attach the peripheral edge of the inflow opening 33 to the bottom wall part 13 of the case 12. Also, a left side of the inflow opening 33 is formed with an insertion hole 35 provided substantially along the right and left direction and having a slit shape in which the tip end 85b of the coupling member 85 extending from the discharge part 45 can be inserted. Also, the left wall part 30 and the right wall part 31 of the peripheral wall part 27 are formed with vent holes 38, 38 provided so as to exhaust the extra inflation gas introduced into the bag main body 26 and opened in a substantially circular shape. In the illustrative embodiment, the vent holes 38 are formed at substantial centers in the upper and lower directions at rear positions of the centers in the front and rear direction of the left wall part 30 and the right wall part 31.

The passenger-side wall part 42 is arranged substantially in the vertical direction at the rear end-side of the bag main body 26 becoming the passenger MP-side so that it is to face the passenger MP sitting on the front passenger seat PS upon completion of the inflation of the bag main body 26. The passenger-side wall part 42 is formed so that a center thereof in the right and left direction is formed to be slightly concave forward along the upper and lower direction upon completion of the inflation of the bag main body 26 (refer to FIGS. 4 and 5).

As shown in FIGS. 3 and 4, the tethers 55, 56 arranged in the bag main body 26 are configured to couple parts adjacent to the rear ends of the left wall part 30 and the right wall part 31, are arranged substantially in the right and left direction upon completion of the inflation of the bag main body 26, and are formed at two places in the upper and lower direction, in the illustrative embodiment. Specifically, each of the tethers 55, 56 has a band shape, is arranged so that a width direction thereof is to follow substantially the upper and lower direction, and is bisected at the left and right sides, so that each is configured by two band-shaped base fabrics 58L, 58R; 59L, 59R for tether (refer to FIGS. 3 and 6).

In the illustrative embodiment, the discharge part 45 is arranged at a front position of the vent hole 38 at the left wall part 30, and has the exhaust hole 48 through which the inflation gas G can be exhausted. The discharge part 45 is formed integrally with the bag main body 26, and when the discharge part is deployed flat, an outer shape thereof as seen from a side is a substantially triangular shape tapered toward a tip end 45b-side coupling the coupling member 85. The discharge part 45 is configured so that it is kept with being pulled in the bag main body 26 when the bag main body 26 inflates in a state where the coupling of the coupling member 85 with the engagement member 16 is kept (refer to FIGS. 8 to 10) and so that the pulled state of the discharge part into the bag main body 26 is released and the discharge part protrudes from the bag main body 26 when the bag main body 26 inflates in a state where the coupling of the coupling member 85 with the engagement member 16 is released (refer to FIGS. 11 and 12). In the illustrative embodiment, when the discharge part 45 protrudes from a general part 44 of the bag main body 26, an outer shape thereof is a substantially flat circular truncated conical shape. Specifically, the discharge part 45 is configured by coupling outer peripheral edges of two sidewall parts 46, 47, which are formed to continue from a front part 30a and a rear part 30b of the left wall part 30 and have substantially the same outer shapes, and openings 46a, 47a having a substantially circular shape are respectively arranged at positions of the sidewall parts 46, 47 in the vicinity of the tip end 45b. In the illustrative embodiment, the openings 46a, 47a are formed at substantially the same positions of the sidewall parts 46, 47. The openings 46*a*, 47*a* configure the exhaust hole 48. In the case of the discharge part 45 of the illustrative embodiment, a seal part 50 at which the sidewall parts 46, 47 are crimped to each other is formed in the vicinity of a part (a boundary part with the left wall part 30) of a base part 45*a*-side so as to be substantially perpendicular to the coupling member 85 (so as to continue from a joining part 51 formed by joining a rear edge 68 and a front edge 73 of a front part 67 and a rear part 72, which will be described later) when pulling the discharge part into the bag main body 26, and the openings 46*a*, 47*a* (the exhaust hole 48) are formed in regions closer to the tip end 45*b*-side than the seal part 50 (refer to FIGS. 8 to 10).

The coupling member 85 configured to couple the discharge part 45 to the engagement member 16 is a member provided separately from the bag main body 26, is made of a band-shaped fabric material having flexibility, and is sewn (joined) at a base part 85*a*-side to the tip end 45*b*-side of the discharge part 45 (refer to FIGS. 4 and 5). The tip end 85*b*-side of the coupling member 85 is formed with the engaging hole 86 in which the engaging pin 17 of the engagement member 16 can be inserted. The coupling member 85 has a length dimension set so that the engaging pin 17 is inserted in the engaging hole 86 to keep the engagement with the engaging pin 17 and the airbag 25 can inflate without any problem even when the airbag 25 is to inflate in a close mode in which the discharge part 45 is pulled into the bag main body 26. In the airbag device M of the illustrative embodiment, when the airbag 25 inflates in the close mode in which the engagement between the coupling member 85 and the engagement member 16 is kept, the airbag 25 inflates in a state where the discharge part 45 is pulled in the bag main body 26 by the coupling member 85, and the sidewall parts 46, 47 around the exhaust hole 48 are crimped to each other by an internal pressure of the inflation gas introduced into the bag main body 26, so that the exhaust hole 48 is suppressed from opening (refer to FIGS. 8 to 10). Also, when the airbag 25 inflates in an open mode in which the engagement between the coupling member 85 and the engagement member 16 is released, the pulled state of the discharge part 45 into the bag main body 26 is released and the discharge part protrudes from the bag main body 26 with being inverted with respect to the bag main body 26, so that the exhaust hole 58 is opened (refer to FIGS. 11 and 12).

Figure 6:
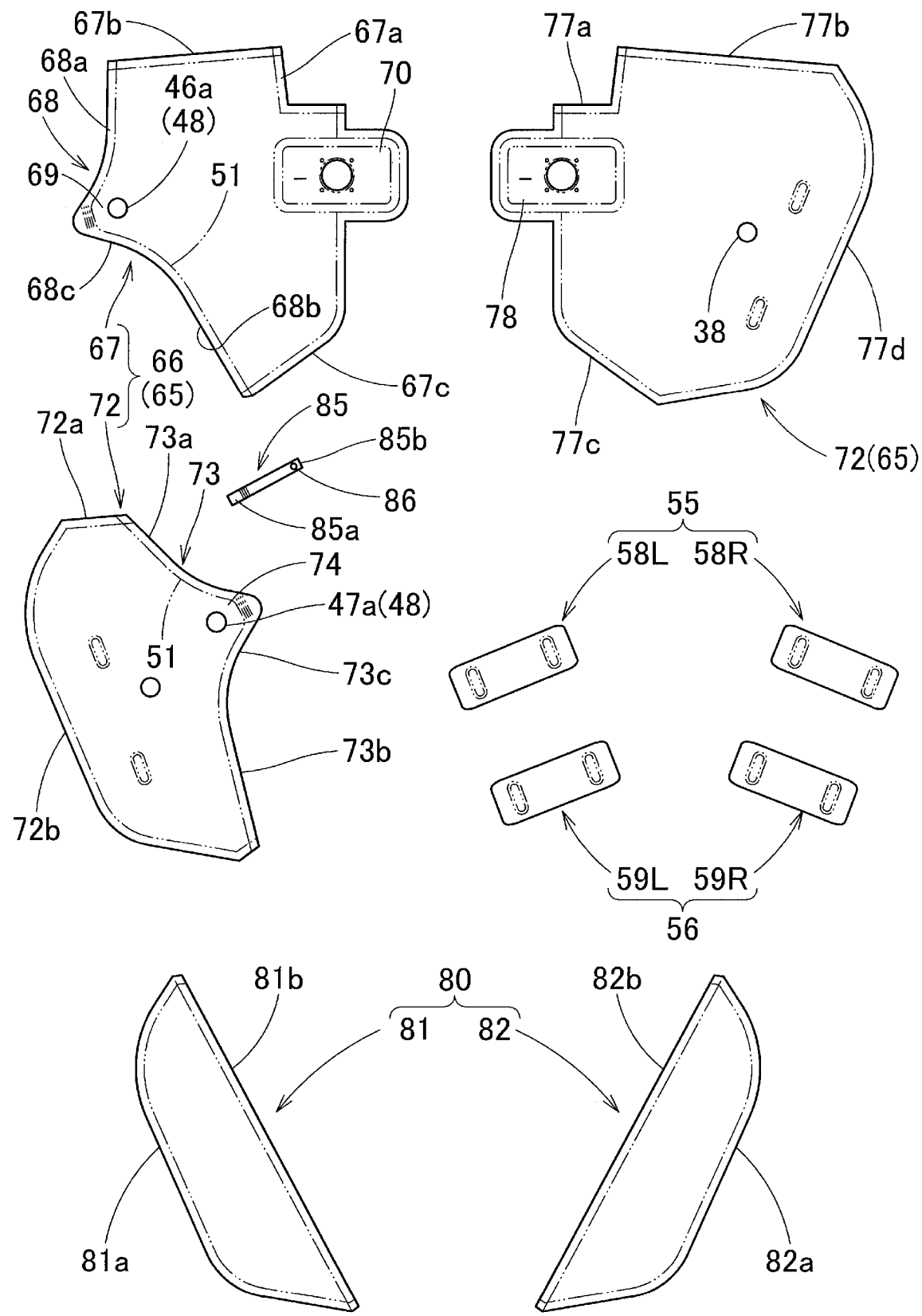
FIG. 6 is a plan view depicting a base fabric configuring the airbag of FIG. 3.

The bag main body 26 is configured to have a bag shape by joining peripheral edges of base fabrics having a predetermined shape. In the illustrative embodiment, as shown in FIG. 6, the bag main body 26 is mainly configured by a peripheral wall panel part 65 constituting the peripheral wall part 27-side and a passenger-side panel part 80 constituting the passenger-side wall part 42-side. The peripheral wall panel part 65 has a left panel part 66 constituting a left region and a right panel part 77 constituting a right region, which are formed by substantially bisecting the peripheral wall part 27, as seen from the right and left direction. The left panel part 66 constitutes a region ranging from a region of a left half part of the upper wall part 28 of the peripheral wall part 27 to a region of a left half part of the lower wall part 29 via the left wall part 30, and the right panel part 77 constitutes a region ranging from a region of a right half part of the upper wall part 28 of the peripheral wall part 27 to a region of a right half part of the lower wall part 29 via the right wall part 31. The left panel part 66 and the right panel part 77 have protrusions 70, 78, respectively, which constitute a region of the peripheral edge of the inflow opening 33.

In the illustrative embodiment, as shown in FIG. 6, the left panel part 66 is bisected at the front and rear sides (the inflow opening 33-side and the passenger-side wall part 42-side). In the illustrative embodiment, the front part 67 and the rear part 72 constituting the left panel part 66 configure a pair of peripheral wall constituting parts constituting the peripheral wall (the left wall part 30, the left half part of the upper wall part 28 and the left half part of the lower wall part 29) upon the inflation.

The front part 67 has a discharge part forming portion 69 constituting the sidewall part 46 of the discharge part 45 and partially protruding at the rear edge 68-side, and the rear edge 68 has edge portions 68*a*, 68*b* for peripheral wall formation arranged at an upper edge-side and a lower edge-side and constituting the peripheral wall part 27 and an edge portion 68*c* for discharge part formation formed to continue from the edge portions 68*a*, 68*b* for peripheral wall formation between the edge portions 68*a*, 68*b* for peripheral wall formation. In the illustrative embodiment, the discharge part forming portion 69 has a substantially triangular outer shape. The opening 46*a* constituting the exhaust hole 48 is formed in a region of the discharge part forming portion 69. In the illustrative embodiment, the two edge portions 68*a*, 68*b* for peripheral wall formation are respectively inclined to protrude backward toward a center-side in the upper and lower direction, and the edge portion 68*c* for discharge part formation gently continues from the edge portions 68*a*, 68*b* for peripheral wall formation and forms a substantially trapezoidal outer shape.

The rear part 72 has a discharge part forming portion 74 constituting the sidewall part 47 of the discharge part 45 and partially protruding at the front edge 73, and the front edge 73 has edge portions 73*a*, 73*b* for peripheral wall formation arranged at an upper edge-side and a lower edge-side and constituting the peripheral wall part 27, and an edge portion 73*c* for discharge part formation formed to continue from the edge portions 73*a*, 73*b* for peripheral wall formation between the edge portions 73*a*, 73*b* for peripheral wall formation. As shown in FIG. 6, a region of the front edge 73-side of the rear part 72 has an outer shape configured to be the same as a region of the rear edge 68-side of the front part 67 in a state where the outer peripheral surfaces of the airbag 25 are overlapped so as to contact each other. The detailed description thereof is omitted.

Figure 7:
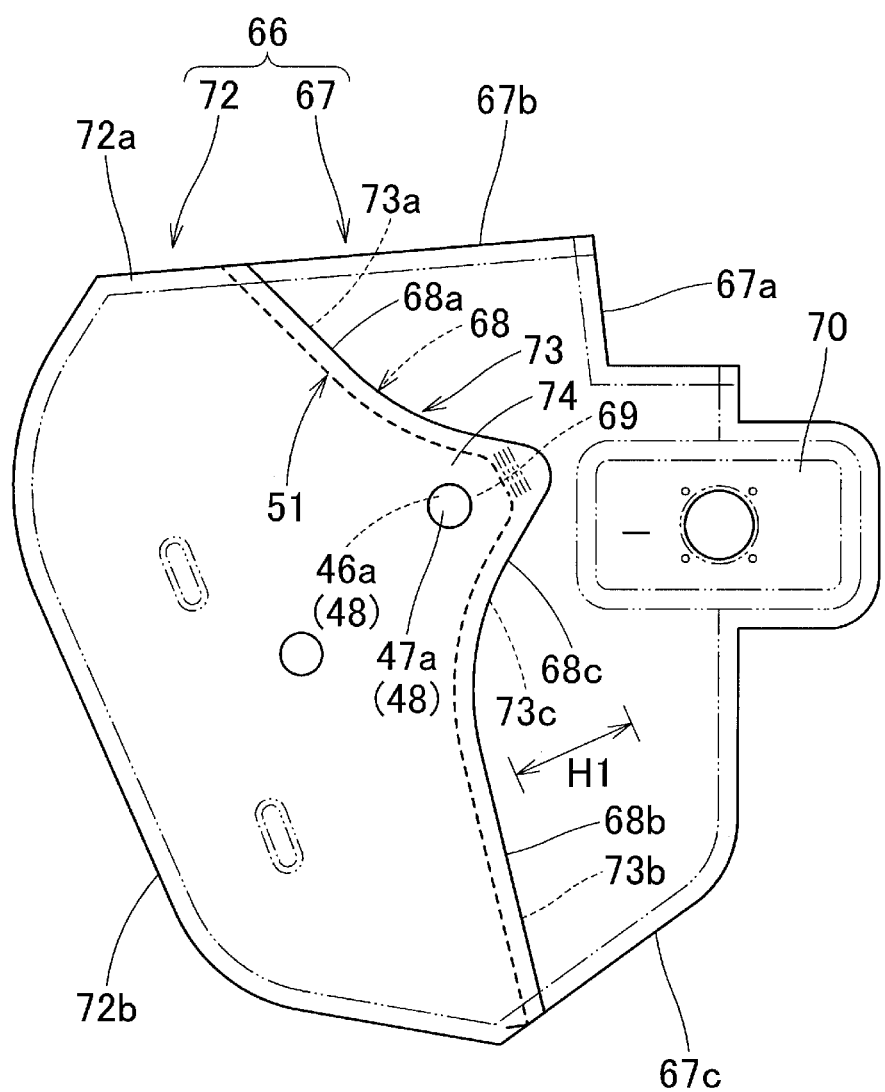
FIG. 7 is a plan view depicting a state where a left panel part, which is formed by sewing a front part and a rear part of the base fabric configuring the airbag, is deployed flat.

The left panel part 66 forms the joining part 51 by joining (sewing) the rear edge 68 of the front part 67 and the front edge 73 of the rear part 72 each other with being overlapped with each other, and the outer shape thereof is the same as the right panel part 77 when the front part 67 and the rear part 72 are deployed flat so as to be opened (refer to FIGS. 6 and 7).

The passenger-side panel part 80 mainly has a left part 81 constituting a left region and a right part 82 constituting a right region, which are formed by substantially bisecting the passenger-side wall part 42, as seen from the right and left direction.

In the illustrative embodiment, the left panel part 66 (the front part 67 and the rear part 72), the right panel part 77, and the passenger-side panel part 80 (the left part 81 and the right part 82), which constitute the bag main body 26, and the base fabrics 58L, 58R, 59L, 59R for tether, which constitute the tethers 55, 56 are formed of flexible woven fabric composed of polyester yarn, polyamide yarn and the like, respectively.

As shown in FIGS. 3 to 6, the bag main body 26 of the illustrative embodiment is formed to have a bag shape by sewing (joining) the corresponding edge portions of the left panel part 66 (the front part 67 and the rear part 72), the right panel part 77 and the passenger-side panel part 80 (the left part 81 and the right part 82) with the sewing threads. As described above, the front part 67 and the rear part 72 of the left panel part 66 are configured to form the joining part 51, so that the rear edge 68 of the front part 67 and the front edge 73 of the rear part 72 are joined to each other. Also, the base part 85a-side of the coupling member 85 is joined (sewn) in advance to the tip end-side of a part constituting the discharge part 45 after joining the rear edge 68 and the front edge 73 of the front part 67 and the rear part 72. The protrusions 70, 78 of the left panel part 66 and the right panel part 77 are sewn at the peripheral edge of the inflow opening 33 and at a substantially rectangular area of an outer periphery-side thereof, with being overlapped with each other. Upper edges 67b, 72a of the front part 67 and the rear part 72 of the left panel part 66 are joined to an upper edge 77b of the right panel part 77. A lower edge 67c of the front part 67 of the left panel part 66 is joined to a lower edge 77c of the right panel part 77. A front upper edge 67a of the front part 67 of the left panel part 66 is folded in folio, which are then joined to each other. Likewise, a front upper edge 77a of the right panel part 77 is also folded in folio, which are then joined to each other. The left part 81 and the right part 82 of the passenger-side panel part 80 are joined to each other at inner edges 81b, 82b. A rear edge 72b of the rear part 72 of the left panel part 66 is joined to an outer edge 81a of the left part 81 of the passenger-side panel part 80. A rear edge 77d of the right panel part 77 is joined to an outer edge 82a of the right part 82 of the passenger-side panel part 80.

Subsequently, a process of mounting the airbag device M for a front passenger seat of the illustrative embodiment to the vehicle is described. First, the airbag 25 is folded to be accommodated in the case 12 with the retainer 9 being accommodated therein, and a surrounding of the folded airbag 25 is wrapped by a rupturable wrapping sheet (not shown) so as to prevent the folded airbag from being unfolded. At this time, the tip end 85b-side of the coupling member 85 extending from the discharge part 45 is made to protrude from the insertion hole 35 formed in the bag main body 26. Then, the folded airbag 25 is accommodated in the case 12 to which the engagement member 16 is attached in advance, with the bolts 9a protruding from the bottom wall part 13. Then, the engaging pin 17 of the engagement member 16 is inserted in the engaging hole 86 of the coupling member 85 protruding from the through-hole 13b formed in the bottom wall part 13 and the tip end of the engaging pin 17 is supported to the support bracket 19, so that the tip end 85b-side of the coupling member 85 is engaged with the engagement member 16. Then, the main body part 8a of the inflator 8 is inserted into the case 12 from below the bottom wall part 13, and the bolts 9a of the retainer 9 protruding downward from the bottom wall part 13 are inserted in the flange part 8c of the inflator 8. Thereafter, when each bolt 9a protruding from the flange part 8c of the inflator 8 is fastened with the nut 10, the folded airbag 25 and the inflator 8 can be attached to the case 12.

Thereafter, when the peripheral wall part 14 of the case 12 is engaged with the coupling wall part 6c of the airbag cover 6 of the instrument panel 1 mounted to the vehicle, the bracket (not shown) provided to the case 12 is fixed to the body-side of the vehicle and the inflator 8 and the engagement member 16 are electrically connected to the control device 90, the airbag device M for a front passenger seat can be mounted to the vehicle.

After the airbag device M for a front passenger seat is mounted to the vehicle, when a front collision of the vehicle is detected, the control device 90 outputs the activating signal to the inflator 8, so that the inflator 8 discharges the inflation gas from the gas discharge ports 8b. Thereby, the airbag 25 inflates as the inflation gas is introduced therein, thereby pushing and opening the door parts 6a, 6b of the airbag cover 6. Then, the airbag 25 protrudes upward from the case 12 via an opening, which is formed as the door parts 6a, 6b of the airbag cover 6 are pushed and opened, deploys and inflates with protruding toward the rear side of the vehicle, and completes the inflation thereof so as to block a space between the upper surface 2 of the instrument panel 1 and the windshield 4 above the instrument panel 1, as shown with the dashed-two dotted line in FIG. 1, and FIG. 8.

In the airbag device M of the illustrative embodiment, the discharge part 45 having the exhaust hole 48 of the airbag 25 is configured by the discharge part forming portions 69, 74 partially protruding from the pair of peripheral wall constituting parts (the front part 67 and the rear part 72) constituting the bag main body 26. The peripheral wall constituting parts (the front part 67 and the rear part 72) have the edge portions 68a, 68b, 73a, 73b for peripheral wall formation and the edge portions 68c, 73c for discharge part formation formed to continue from the edge portions 68a, 68b, 73a, 73b for peripheral wall formation, respectively. Therefore, during the manufacturing of the airbag 25, when the front part 67 and the rear part 72 are overlapped with each other, the edge portions 68a, 68b, 73a, 73b for peripheral wall formation are joined to each other and the edge portions 68c, 73c for discharge part formation formed to continue from the edge portions 68a, 68b, 73a, 73b for peripheral wall formation are joined to each other, a peripheral wall of the bag main body 26 is formed and the discharge part 45 to protrude from the bag main body 26 is also formed at the same time, so that it is possible to conveniently manufacture the discharge part 45 integrally with the bag main body 26. Also, the discharge part 45 has the configuration where the openings 46a, 47a constituting the exhaust hole 48 are formed (notched) and are arranged in the region, which is closer to the tip end-side than the seal parts 50 crimped to each other when the discharge part is pulled into the bag main body 26, of the discharge part forming portions 69, 74. Therefore, it is possible to stably keep a closed state of the exhaust hole 48 while the coupling of the coupling member 85 with the engagement member 16 as the opening/closing control device is kept. Also, when the coupling of the coupling member 85 with the engagement member 16 is released, the exhaust hole 48 can be rapidly opened and the discharge part 45 inflates with protruding from the general part 44 of the bag main body 26. Therefore, the exhaust hole 48 of the discharge part 45 is pulled at the entire periphery of the peripheral edge, so that the exhaust hole is largely opened and an opening shape (opening area) can be stabilized. For this reason, upon the opening of the exhaust hole 48, it is possible to make the opening area substantially constant, and to stabilize an exhaust amount of the inflation gas G. In particular, in the illustrative embodiment, since the protruding shape of the discharge part 45 from the bag main body 26 is the substantially tapered circular truncated conical shape, the inflation gas can be easily filled up to the tip end of the discharge part, so that the discharge part can rapidly inflate to apply the tension over the entire range of the peripheral edge of the opening. Therefore, it is possible to stabilize the opening shape being largely opened.

Therefore, the airbag device M of the illustrative embodiment has the simple configuration and can stabilize the exhaust amount of the inflation gas upon opening.

Specifically, according to the airbag device M of the illustrative embodiment, the opening/closing control device configured to control the opening/closing of the exhaust hole 48 is configured by the engagement member 16 that is to engage with the tip end 85b-side of the coupling member 85 extending from the discharge part 45.

Figure 11:
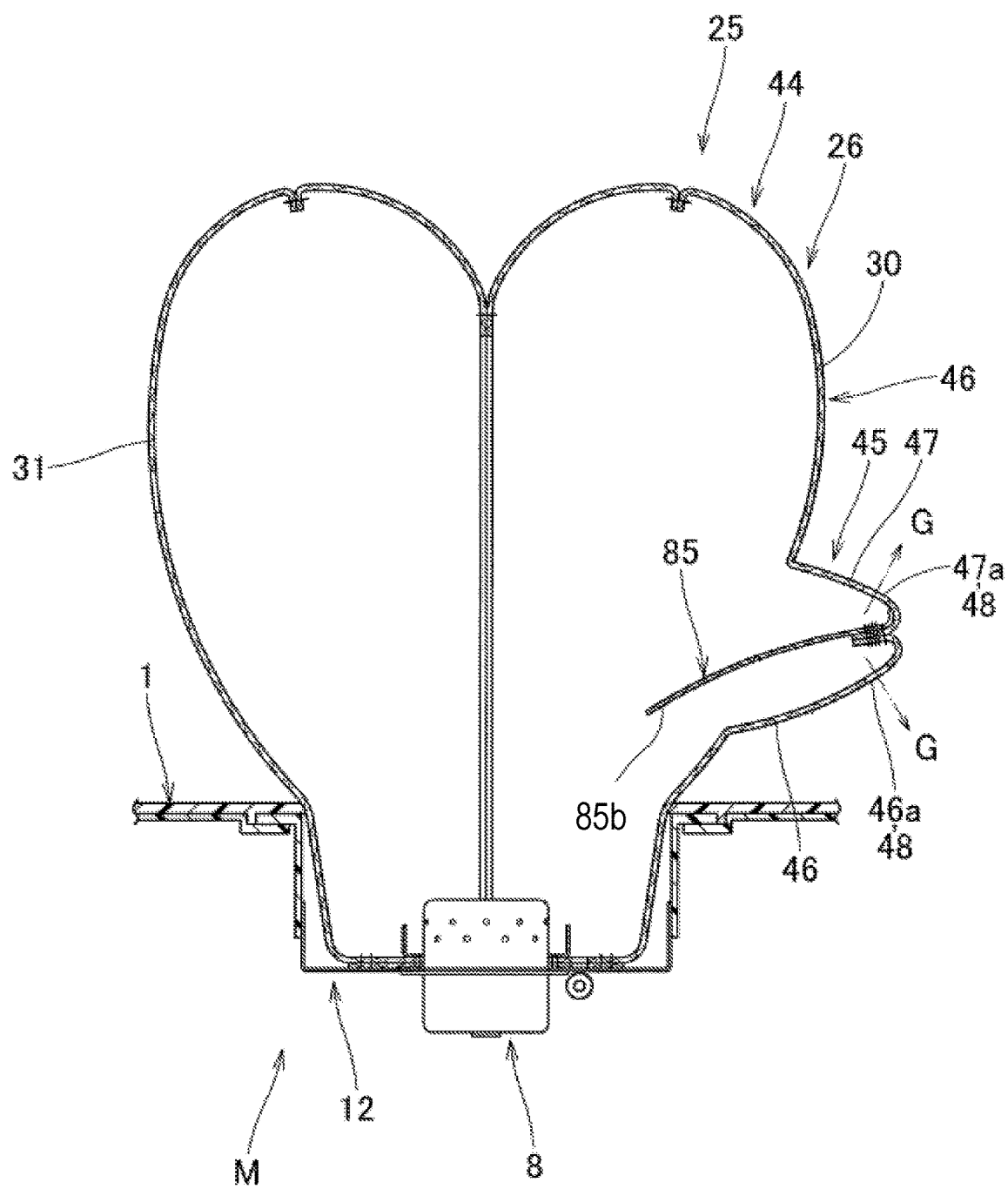
FIG. 11 is a schematic sectional view in the front and rear direction, depicting a state where the inflation of the airbag in an open mode is completed in the airbag device of the illustrative embodiment.
Figure 12:
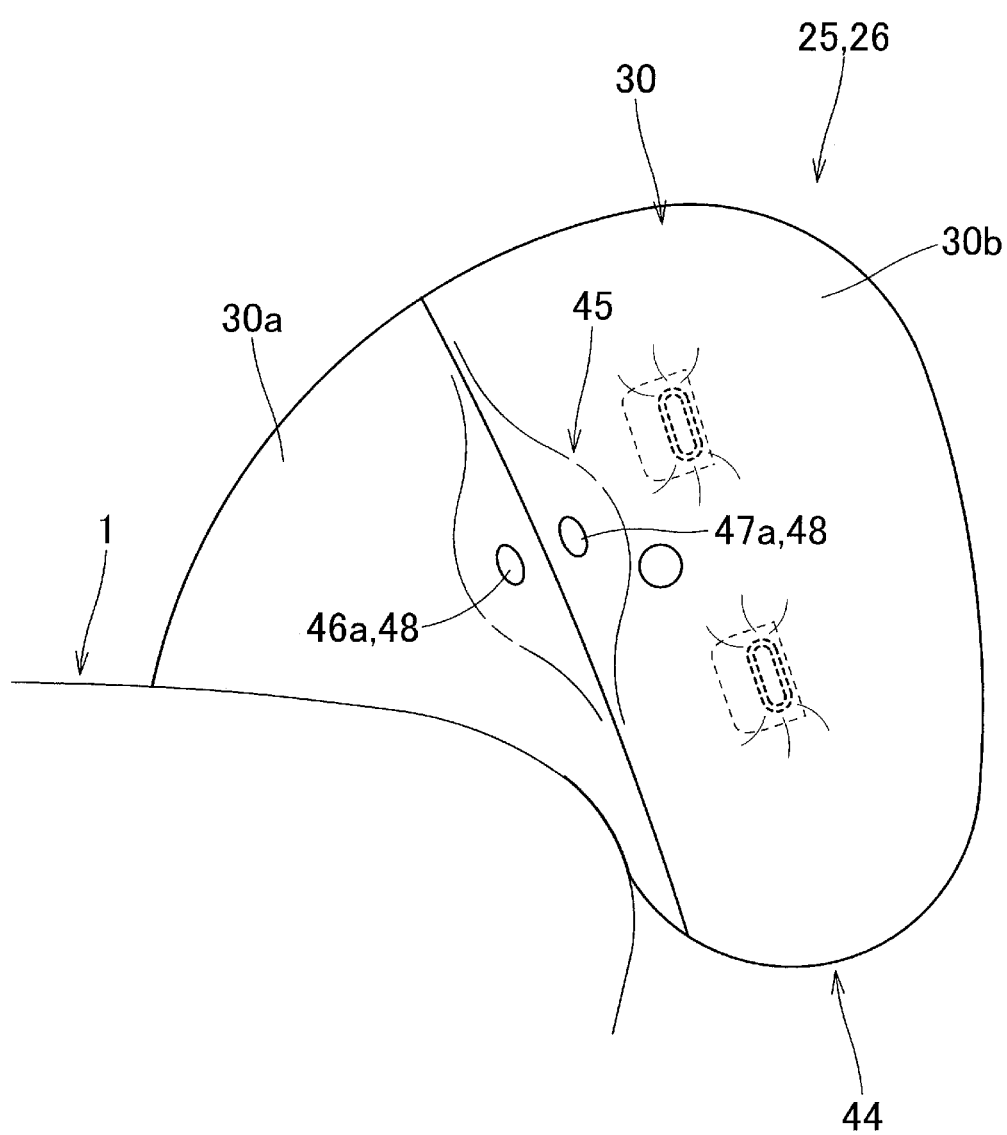
FIG. 12 is a schematic side view depicting a state where the inflation of the airbag in the open mode is completed in the airbag device of the illustrative embodiment.

Also, according to the airbag device M of the illustrative embodiment, when the control device 90 to which the signals from the predetermined sensors 91, 92, 93 are to be input detects that a small-sized passenger MP1 sits on a seat or that the passenger MP sits on a position close to the instrument panel 1, the control device activates the inflator 8 and outputs the activating signal to the actuator 18 of the engagement member 16 substantially at the same time, so that the engaging pin 17 is pulled in. Then, as shown in FIGS. 11 and 12, the airbag 25 inflates in the open mode where the discharge part 45 protrudes from the bag main body 26 and the exhaust hole 48 is thus opened, and completes the inflation while exhausting the extra inflation gas G from the exhaust hole 48. For this reason, since the airbag 25 completes the inflation in the state where the extra inflation gas G from the exhaust hole 48 is exhausted and the increase in the internal pressure is suppressed, it is possible to suppress the small-sized passenger MP or the passenger MP sitting in the vicinity of the instrument panel 1 from being pressed beyond necessity by the airbag 25 of which the internal pressure is set low, thereby softly protecting the passenger. At this time, according to the airbag device M of the illustrative embodiment, upon the opening of the exhaust hole 48, since it is possible to make the opening area thereof substantially constant, as described above, it is possible to stabilize the exhaust amount of the inflation gas G, too, and to correctly suppress the increase in the internal pressure of the airbag 25.

Figure 9:
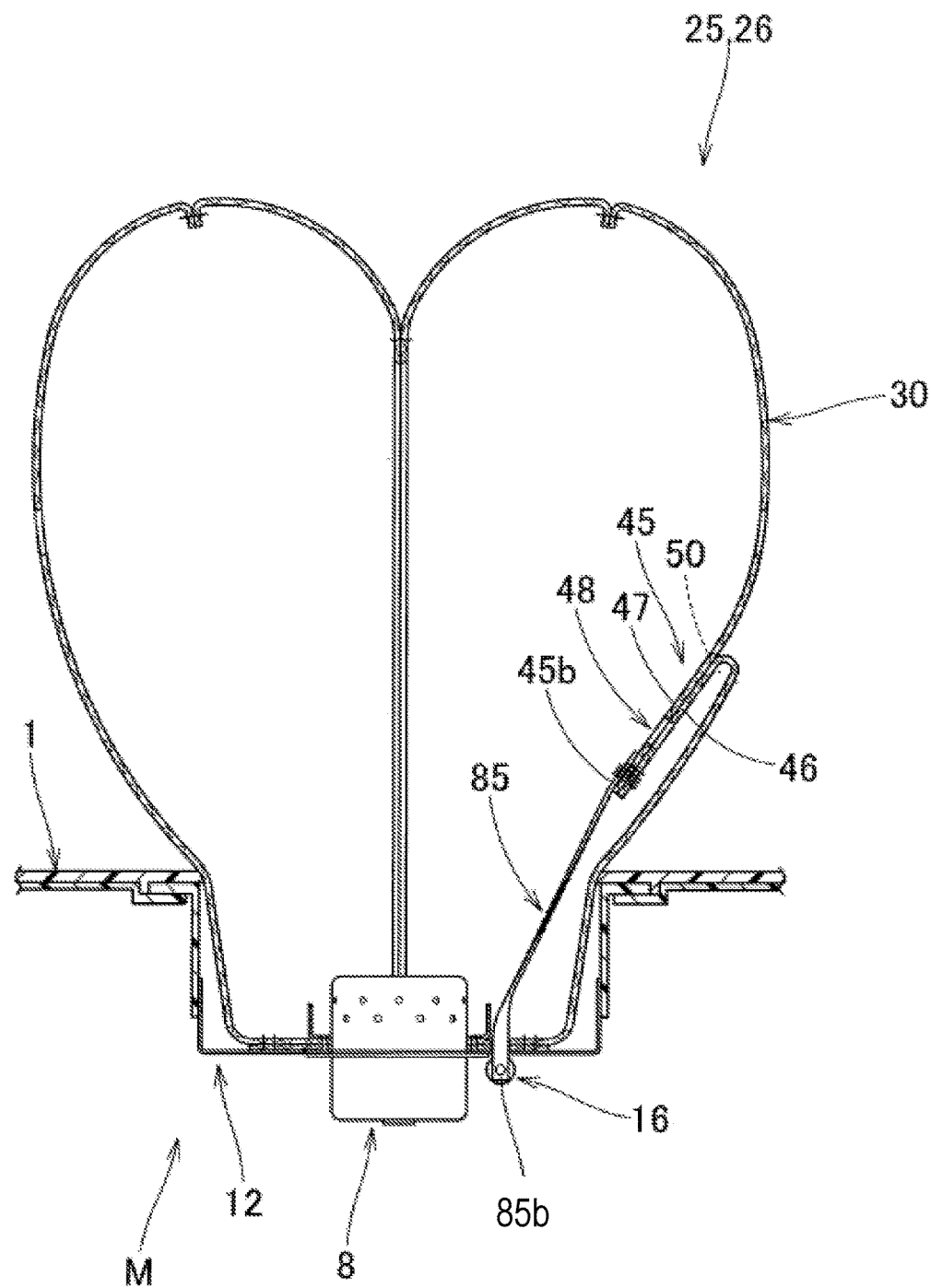
FIG. 9 is a schematic sectional view in the front and rear direction, depicting a state where the inflation of the airbag in the close mode is completed in the airbag device of the illustrative embodiment.
Figure 10:
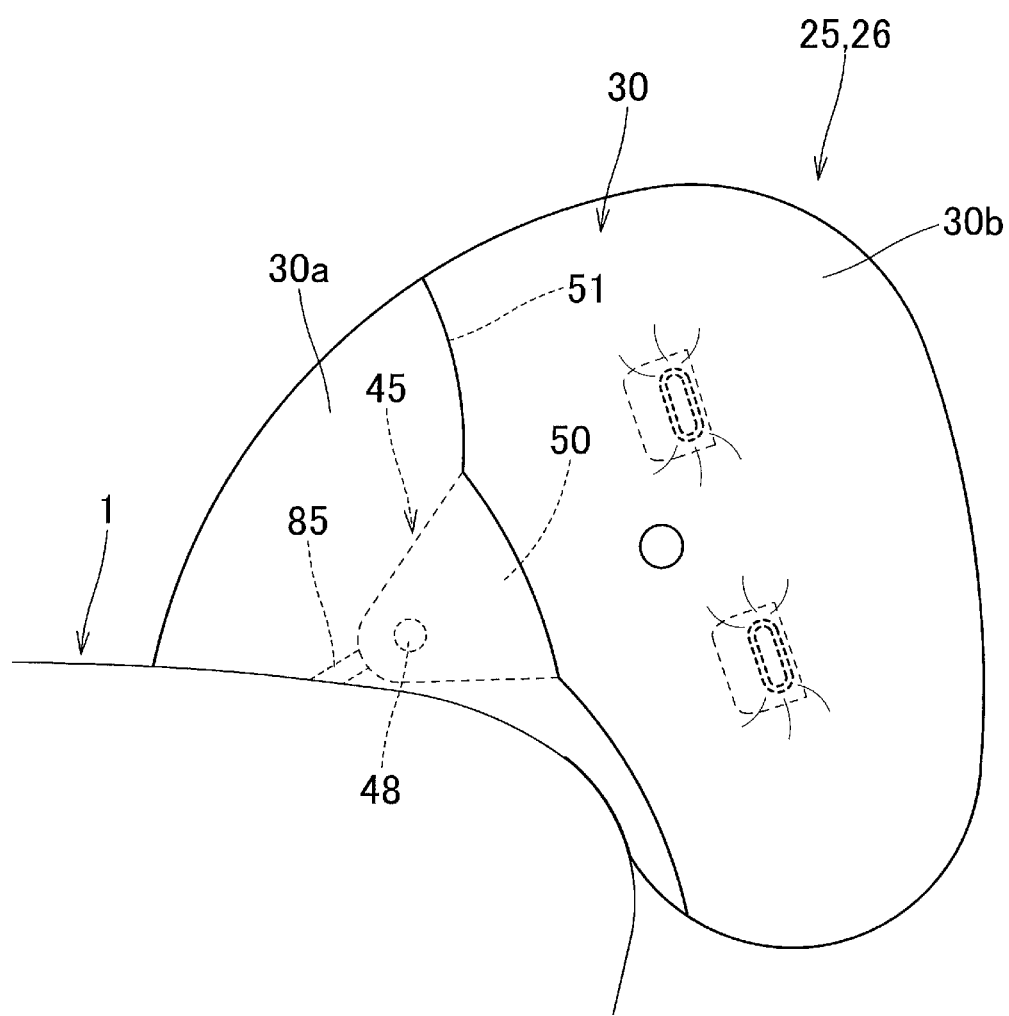
FIG. 10 is a schematic side view depicting a state where the inflation of the airbag in the close mode is completed in the airbag device of the illustrative embodiment.

On the other hand, when the control device 90 detects that a large-sized passenger MP2 sits on the seat or the passenger MP sits on a position distant from the instrument panel 1, the activating signal is not output from the control device 90 to the actuator 18, so that the airbag 25 inflates in a close mode where the sidewall parts 46, 47 around the exhaust hole 48 are crimped to each other to close the exhaust hole 48, in a state where the pulled-in state of the discharge part 45 is kept, and completes the inflation with the closed state of the exhaust hole 48 being kept, as shown in FIGS. 8 to 10. For this reason, since the airbag 25 completes the inflation in a high internal pressure state where the inflation gas is not exhausted from the exhaust hole 48, it is possible to correctly protect the large-sized passenger MP2 or the passenger MP sitting on the position distant from the instrument panel 1 by the airbag 25, which has inflated with good cushioning characteristic while securing the sufficient internal pressure, without bottoming out the airbag.

Figure 13:
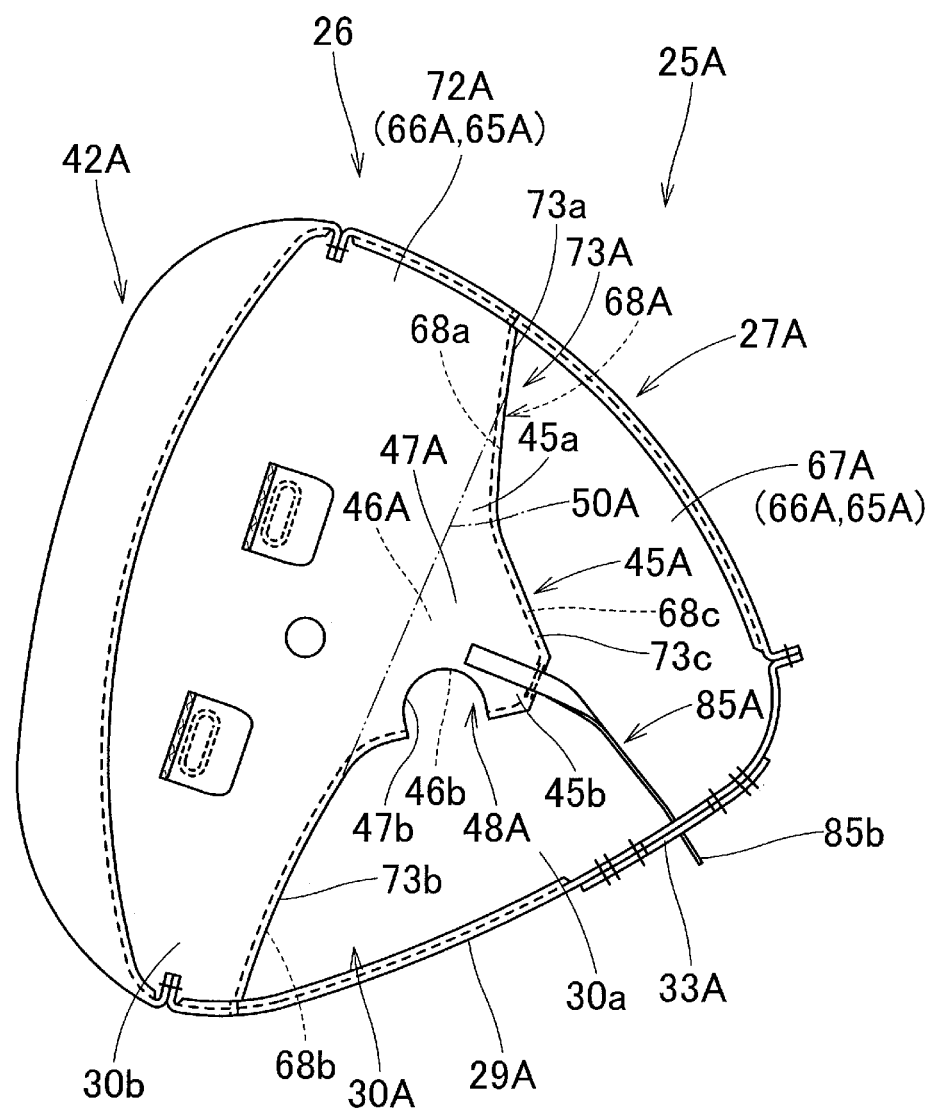
FIG. 13 is a schematic sectional view of an airbag, which is another form of the present invention, in the front and rear direction of the vehicle.
Figure 14:
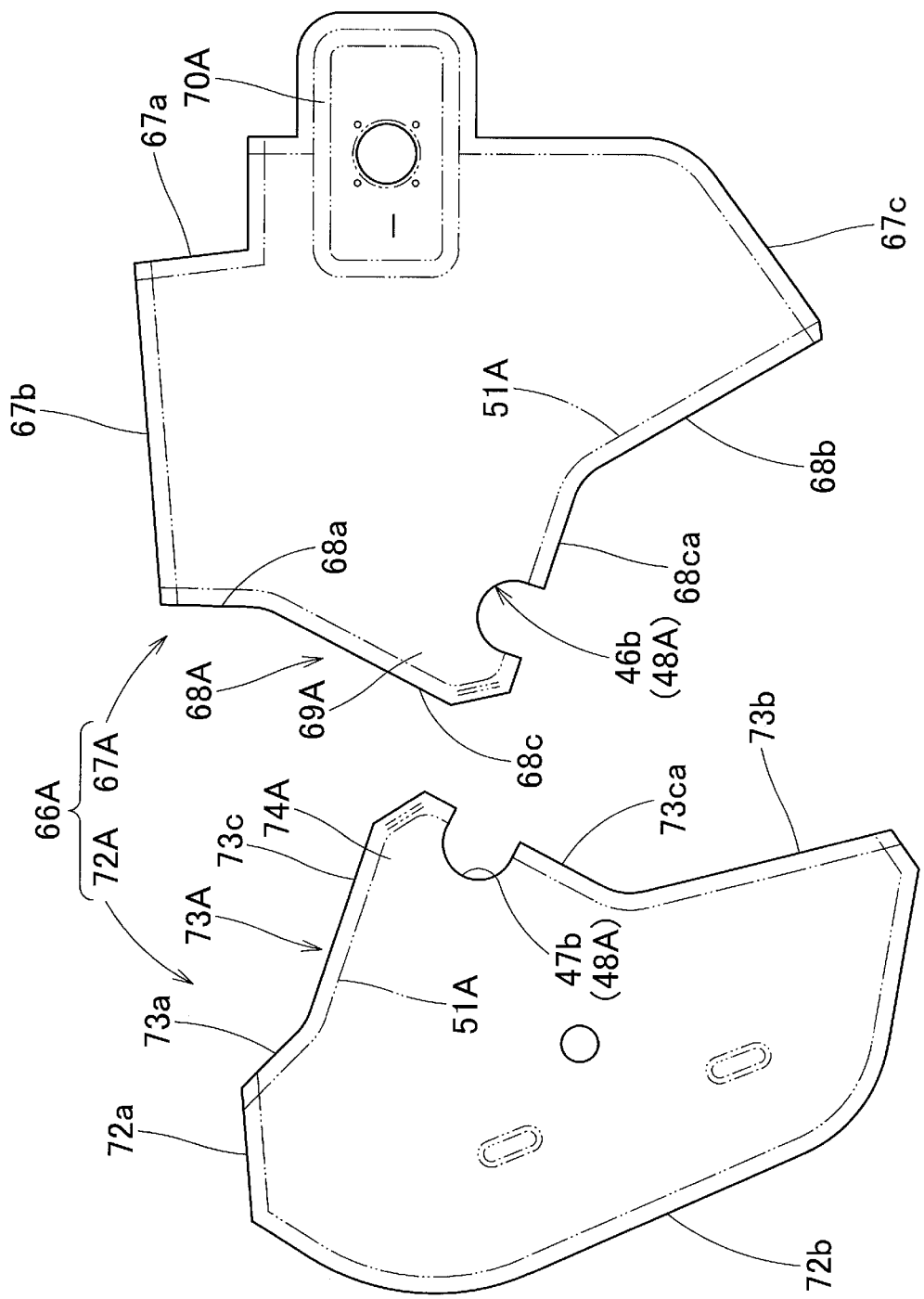
FIG. 14 is a plan view depicting a state where a front part and a rear part, which configure a left panel part, of a base fabric configuring the airbag of FIG. 13 are aligned.

In the below, an airbag 25A of another form is described. As shown in FIG. 13, the airbag 25A is similar to the airbag 25, except that an outer shape of a discharge part 45A is slightly different and an outer shape of an exhaust hole 48A of the discharge part 45A is a little different. Therefore, the reference numerals of the same members are annexed with "A" and the detailed descriptions thereof are omitted. According to the airbag 25A, an outer shape of the discharge part 45A in a flat deployed state is a substantially trapezoidal shape tapered toward the tip end 45b-side, and discharge part forming portions 69A, 74A constituting the discharge part 45A have also a substantially trapezoidal outer shape, respectively (refer to FIG. 14). The exhaust hole 48A provided to the discharge part 45A is configured by portions 46b, 47b formed by notching the peripheral edges of the respective sidewall parts 46A, 47A (the discharge part forming portions 69A, 74A) into a semi-circular shape, respectively (refer to FIG. 14). Specifically, also in the airbag 25A, the exhaust hole 48A is formed in a region, which is closer to the tip end 45b-side than a seal part 50A formed by crimping the sidewall parts 46A, 47A each other, in the vicinity of a part (a boundary part with a left wall part 30A) of the base part 45a-side when pulling the discharge part into the bag main body 26A (refer to FIG. 13). Specifically, the notched portions 46b, 47b constituting the exhaust hole 48A are formed by notching lower end portions of rear parts 68ca, 73ca of the edge portions 68c, 73c for discharge part formation constituting the peripheral edges of the discharge part forming portions 69A, 74A (refer to FIG. 14). Also, in the illustrative embodiment, the notched portions 46b, 47b (the exhaust hole 48A) are located in a region (so as not to extend over an extension line extending from the coupling member 85A) below the extension line L extending from the coupling member 85A, in a state where the discharge part 45A is deployed flat (refer to FIG. 15).

Also in the airbag 25A configured as described above, the discharge part 45A having the exhaust hole 48A is configured by the discharge part forming portions 69A, 74A partially protruding from the pair of peripheral wall constituting parts (the front part 67A and the rear part 72A) constituting the bag main body 26A. The peripheral wall constituting parts (the front part 67A and the rear part 72A) have the edge portions 68a, 68b, 73a, 73b for peripheral wall formation and the edge portions 68c, 73c for discharge part formation formed to continue from the edge portions 68a, 68b, 73a, 73b for peripheral wall formation. Therefore, during the manufacturing of the airbag 25A, when the front part 67A and the rear part 72A are overlapped with each other, the edge portions 68a, 68b, 73a, 73b for peripheral wall formation are joined to each other and the edge portions 68c, 73c for discharge part formation formed to continue from the edge portions 68a, 68b, 73a, 73b for peripheral wall formation are joined to each other except the peripheral edges of the notched portions 46b, 47b, the peripheral wall of the bag main body 26 is formed and the discharge part 45a to protrude from the bag main body 26A is also formed at the same time, so that it is possible to conveniently manufacture the discharge part 45A integrally with the bag main body 26A. Also, the discharge part 45A has the configuration where the notched portions 46b, 47b constituting the exhaust hole 48A are arranged in the region, which is closer to the tip end-side than the seal parts 50A crimped to each other when pulling the discharge part 45A into the bag main body 26A, of the discharge part forming portions 69A, 74A. Therefore, it is possible to stably keep the closed state of the exhaust hole 48A while the coupling of the coupling member 85A with the engagement member 16 is kept. Also, when the coupling of the coupling member 85A with the engagement member 16 is released, the exhaust hole 48A can be rapidly opened and the discharge part 45A inflates with protruding from a general part 44A of the bag main body 26A. Therefore, the exhaust hole 48A of the discharge part 45A is pulled at the entire periphery of the peripheral edge, so that the exhaust hole is largely opened and an opening shape (opening area) can be stabilized. For this reason, upon the opening of the exhaust hole 48A, it is possible to make the opening area substantially constant, and to stabilize the exhaust amount of the inflation gas G.

Figure 15:
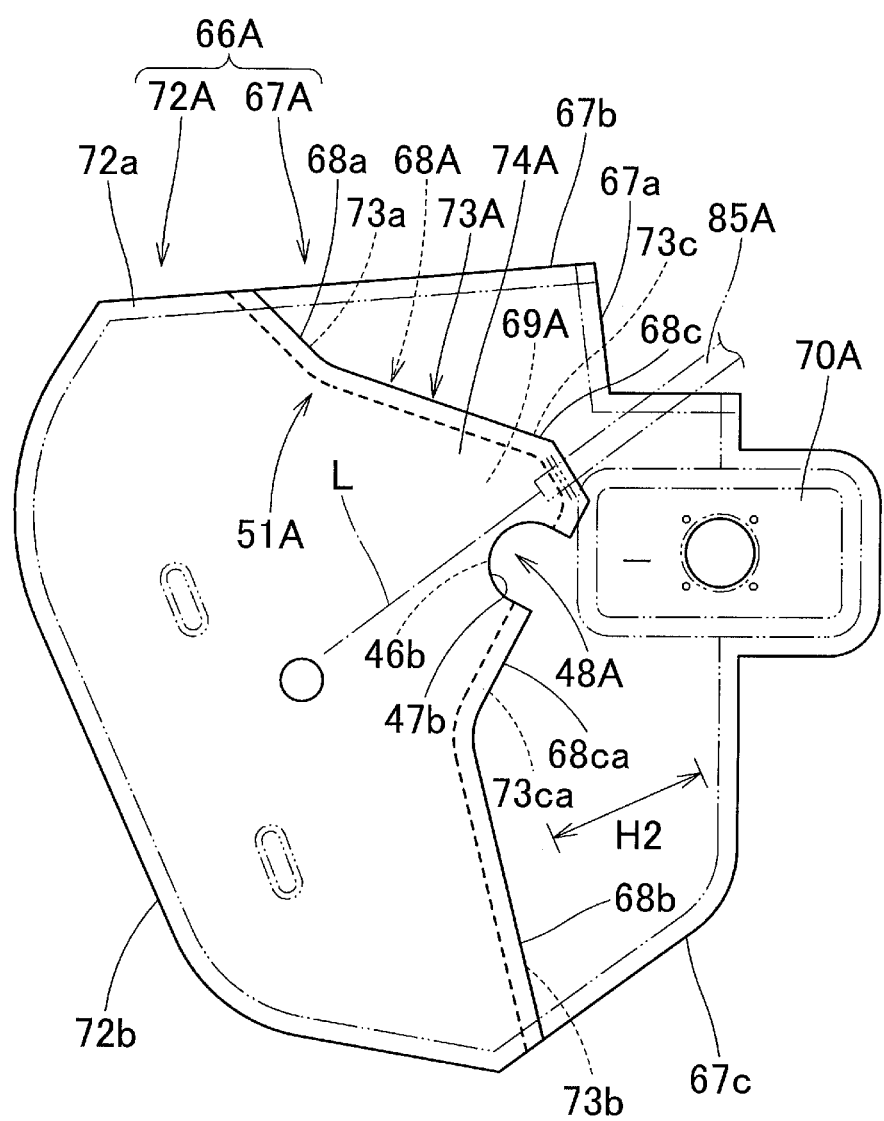
FIG. 15 is a plan view depicting a state where the left panel part, which is formed by sewing the front part and the rear part of the base fabric configuring the airbag of FIG. 13, is deployed flat.
Figure 16:
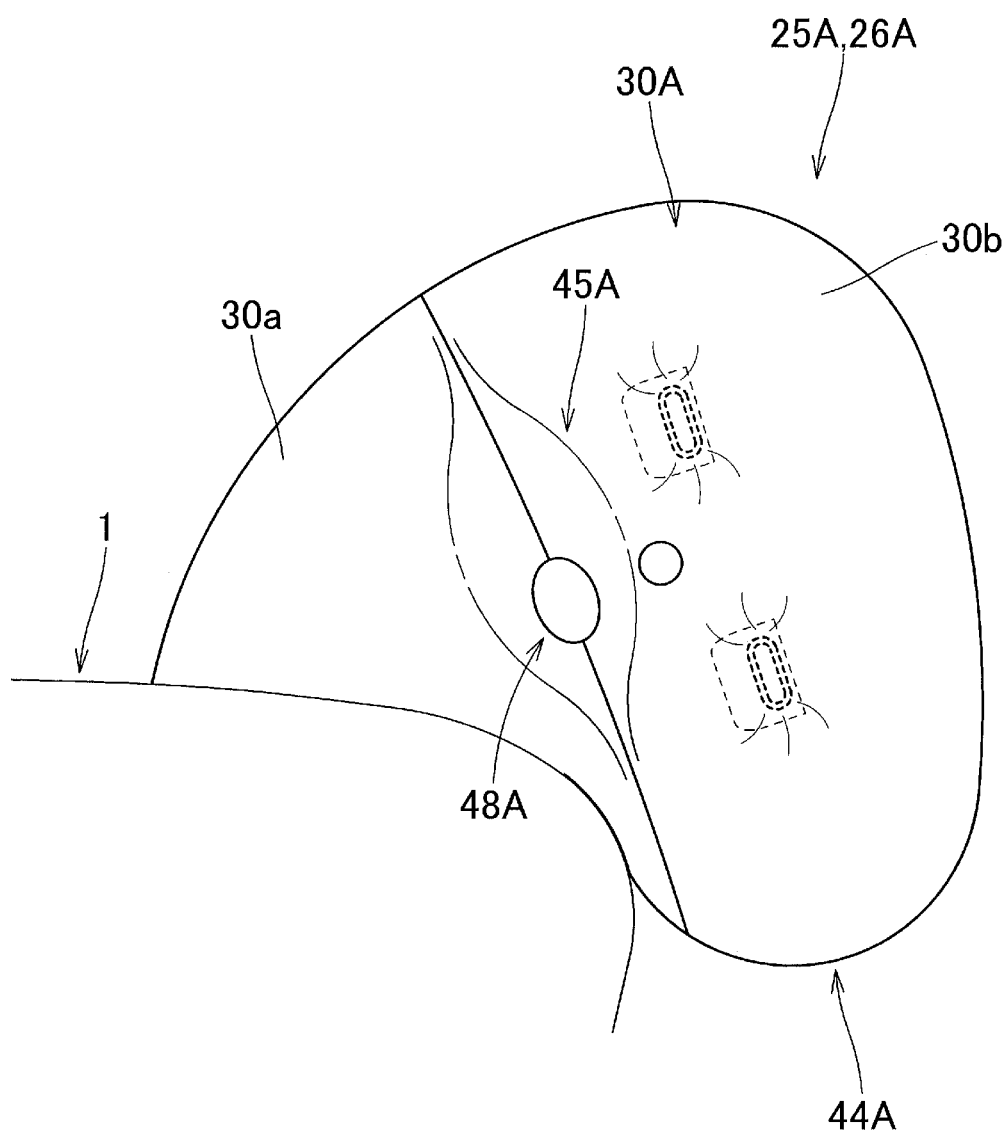
FIG. 16 is a schematic side view depicting a state where the inflation of the airbag in the open mode is completed in the airbag device in which the airbag of FIG. 13 is used.

In particular, in the airbag 25A configured as described above, the notched portions 46b, 47b constituting the exhaust hole 48A are formed by notching the rear parts 68ca, 73ca of the edge portions 68c, 73c for discharge part formation. In other words, the exhaust hole 48A is arranged to open downward upon the inflation of the airbag 25 in the open mode (refer to FIG. 16). For this reason, it is possible to accurately suppress the inflation gas exhausted from the exhaust hole 48A from flowing toward the passenger. Also, in the airbag 25A configured as described above, the notched portions 46*b*, 47*b* constituting the exhaust hole 48A are located in the region (so as not to extend over the extension line extending from the coupling member 85A) below the extension line L extending from the coupling member 85A, in the state where the discharge part 45A is deployed flat, as shown in FIG. 15. Therefore, when the airbag 25A is inflated in the close mode, the exhaust hole 48A is arranged with deviating from a tension line (which substantially coincides with the extension line L extending from the coupling member 85A) formed substantially along the coupling member 85A so as not to extend over the tension line, so that it is possible to correctly crimp the sidewall parts 46A, 47A each other around the exhaust hole 48A and to correctly keep the closed state of the exhaust hole 48A.

Also, in the airbag 25 of the airbag device M of the illustrative embodiment, the openings 46*a*, 47*a* constituting the exhaust hole 48 are formed by cutting the discharge part forming portions 69, 74 into the substantially circular shape. For this reason, as compared to the configuration where the exhaust hole 48A is formed by notching the peripheral edges of the discharge part forming portions 69A, 74A into the substantially semi-circular shape, like the airbag 25A, it is possible to set the opening area small. Since the opening area of the exhaust hole 48 can be set small, it is possible to reduce a size of the discharge part 45 deployed flat (sizes of the discharge part forming portions 69, 74) in the airbag 25 as a whole, as compared to a size of the discharge part 45A (sizes of the discharge part forming portions 69A, 74A) in the airbag 25A (refer to FIGS. 7 and 15). Specifically, in the case where the opening part is opened in a circular shape, the opening area (size) of the opening part is reduced, so that a distance from the seal part to the opening part of the discharge part can be set small. Thereby, it is possible to reduce a height of the discharge part. Actually, a protruding amount (height H1) of the discharge part 45 in a flat deployed state is about ⅝ of a protruding amount (height H2) of the discharge part 45A in a flat deployed state (refer to FIGS. 7 and 15). For this reason, upon the inflation of the airbag 25 in the open mode, it is possible to suppress the discharge part 45 from largely protruding from the bag main body 26, as compared to the discharge part 45A of the airbag 25A, so that it is possible to stably deploy the airbag 25 in a balanced manner. Meanwhile, when the discharge part forming portions are provided with the openings, as the exhaust hole, the openings may be formed at positions offset with each other. Also, when not considering the size of the discharge part, one discharge part forming portion may be formed with one large opening.

In the illustrative embodiment, the airbag device for a front passenger seat has been exemplified. However, the airbag device to which the present invention can be applied is not limited to the illustrative embodiment. For example, the present invention can be applied to an airbag device for a steering wheel, too.

According to an aspect of the invention, there is provided an airbag device comprising: an airbag accommodated with being folded in an accommodation part, configured to inflate with protruding from the accommodation part by allowing an inflation gas to flow into the airbag, and having an exhaust hole capable of discharging a part of the inflation gas introduced therein upon opening; and an opening/closing control device arranged at a side of the accommodation part and capable of controlling opening/closing of the exhaust hole, wherein the airbag has: a flexible bag main body formed to have a bag shape and having an inflow opening for allowing the inflation gas to flow therein, a peripheral edge of the inflow opening coupled to a side of the accommodation part; a discharge part having the exhaust hole; and a coupling member arranged in the bag main body and having a base part-side coupled to the discharge part and a tip end-side coupled to the opening/closing control device arranged in a vicinity of the inflow opening, the discharge part is configured so that, when the bag main body inflates in a state where a coupling of the coupling member with the opening/closing control device is kept, wall parts around the exhaust hole are crimped to each other, and a closed state of the exhaust hole is thus kept in a state where the discharge part is pulled in the bag main body, and when the bag main body inflates in a state where the coupling of the coupling member with the opening/closing control device is released, a pulled state of the discharge part into the bag main body is released, and the discharge part protrudes from the bag main body to open the exhaust hole, peripheral edges of a pair of peripheral wall constituting parts, which are formed of flexible sheet members and constitute a peripheral wall upon inflation, are joined to form the bag main body and the discharge part, discharge part forming portions, which constitute the discharge part, partially protrude in the peripheral wall constituting parts, respectively, the peripheral wall constituting parts have edge parts for peripheral wall formation and edge parts for discharge part formation formed to continue from the edge parts for peripheral wall formation, respectively, the edge parts for peripheral wall formation are joined to each other, and the edge parts for discharge part formation are joined to each other, and the discharge part has a tip end-side coupled to the coupling member, and an opening, which constitutes the exhaust hole, is formed in a region, which is closer to the tip end-side than seal parts crimped to each other when the discharge part is pulled into the bag main body.

In the airbag device of the present invention, the discharge part having the exhaust hole of the airbag is configured by the discharge part forming portions, which are formed to partially protrude from the pair of peripheral wall constituting parts constituting the bag main body. The peripheral wall constituting parts have the edge portions for peripheral wall formation and the edge portions for discharge part formation formed to continue from the edge portions for peripheral wall formation. Therefore, during the manufacturing of the airbag, when the peripheral wall constituting parts are overlapped with each other, the edge portions for peripheral wall formation are joined to each other and the edge portions for discharge part formation formed to continue from the edge portions for peripheral wall formation are joined to each other, a peripheral wall of the bag main body is formed and the discharge part to protrude from the bag main body is also formed at the same time, so that it is possible to conveniently manufacture the discharge part integrally with the bag main body. Also, the discharge part has the configuration where the opening constituting the exhaust hole is formed in the region, which is closer to the tip end-side than the seal parts crimped to each other when the discharge part is pulled into the bag main body. Therefore, it is possible to stably keep a closed state of the exhaust hole while the coupling of the coupling member with the opening/closing control device is kept. Also, when the coupling of the coupling member with the opening/closing control device is released, the exhaust hole can be rapidly opened and the discharge part inflates with protruding from a general part of the bag main body. Therefore, the exhaust hole of the discharge part is pulled at the entire periphery of the peripheral edge thereof, so that the exhaust hole is largely opened and an opening shape (opening area) can be stabilized. For this reason, upon the opening of the exhaust hole, it is possible to make the opening area substantially constant, and to stabilize an exhaust amount of the inflation gas.

Therefore, the airbag device of the present invention has a simple configuration and can stabilize the exhaust amount of the inflation gas upon opening.

Specifically, according to the airbag device of the present invention, the opening may be formed by notching the peripheral edges of the discharge part forming portions into a substantially semi-circular shape. Also, the opening may be formed by cutting at least one of the discharge part forming portions into a substantially circular shape.

What is claimed is:

1. An airbag device comprising:
an airbag accommodated by being folded in an accommodation part, configured to inflate by protruding from the accommodation part by allowing an inflation gas to flow into the airbag, and having an exhaust hole capable of discharging a part of the inflation gas introduced therein upon opening; and
an opening/closing control device arranged at a side of the accommodation part and capable of controlling opening/closing of the exhaust hole, wherein
the airbag has:
a flexible bag main body formed to have a bag shape and having an inflow opening for allowing the inflation gas to flow therein, a peripheral edge of the inflow opening coupled to a side of the accommodation part;
a discharge part having the exhaust hole; and
a coupling member arranged in the bag main body and having a base part-side coupled to the discharge part and a tip end-side coupled to the opening/closing control device arranged in a vicinity of the inflow opening,
the discharge part is configured so that,
when the bag main body inflates in a state where a coupling of the coupling member with the opening/closing control device is kept, wall parts around the exhaust hole are crimped to each other, and a closed state of the exhaust hole is thus kept in a state where the discharge part is pulled in the bag main body, and
when the bag main body inflates in a state where the coupling of the coupling member with the opening/closing control device is released, a pulled state of the discharge part into the bag main body is released, and the discharge part protrudes from the bag main body to open the exhaust hole,
peripheral edges of a pair of peripheral wall constituting parts, which are formed of flexible sheet members and constitute a peripheral wall upon inflation, are joined to form the bag main body and the discharge part,
discharge part forming portions, which constitute the discharge part, partially protrude in the peripheral wall constituting parts, respectively,
the peripheral wall constituting parts have edge parts for peripheral wall formation and edge parts for discharge part formation formed to continue from the edge parts for peripheral wall formation, respectively,
the edge parts for peripheral wall formation are joined to each other, and the edge parts for discharge part formation are joined to each other, and the discharge part has a tip end-side coupled to the coupling member, and an opening, which constitutes the exhaust hole, is formed in the discharge part, when the discharge part is pulled into the bag main body the exhaust hole is closer to the tip end-side of the discharge part than the exhaust hole is to seal parts of the discharge part which are crimped to each other.

2. The airbag device according to claim 1, wherein the opening, which constitutes the exhaust hole, includes openings having a substantially circular shape and formed in the discharge part forming portions, respectively.

3. The airbag device according to claim 1, wherein the opening, which constitutes the exhaust hole, includes openings having a substantially semi-circular shape and formed by notching peripheral edges of the discharge part forming portions, respectively.

4. The airbag device according to claim 1, wherein the opening, which constitutes the exhaust hole, is formed by cutting one of the discharge part forming portions into a substantially circular shape.

5. The airbag device according to claim 1, wherein the opening, which constitutes the exhaust hole, includes a plurality of openings, each opening of the plurality of openings having a substantially circular shape which is cut into one of the discharge part forming portions, respectively.

6. The airbag device according to claim 1, wherein the opening, which constitutes the exhaust hole, includes a plurality of openings, each opening of the plurality of openings having a substantially semi-circular shape which is notched out of peripheral edges of the discharge part forming portions, respectively.

7. The airbag device according to claim 1, wherein the opening, which constitutes the exhaust hole, is formed by cutting a substantially circular shape into one of the discharge part forming portions.

8. The airbag device according to claim 1, wherein
when the discharge part is deployed flat, (i) the discharge part has a substantially triangular shape tapered toward the tip end-side of the discharge part and (ii) the opening which constitutes the exhaust hole has a substantially circular shape or a substantially semicircular shape in the vicinity of the tip end-side of the discharge part.

9. An airbag device comprising:
an airbag accommodated by being folded in an accommodation part, configured to inflate by protruding from the accommodation part by allowing an inflation gas to flow into the airbag, and having an exhaust hole capable of discharging a part of the inflation gas introduced therein upon opening; and
an opening/closing control device arranged at a side of the accommodation part and capable of controlling opening/closing of the exhaust hole, wherein
the airbag has:
a flexible bag main body formed to have a bag shape and having an inflow opening for allowing the inflation gas to flow therein, a peripheral edge of the inflow opening coupled to a side of the accommodation part;
a discharge part having the exhaust hole; and
a coupling member arranged in the bag main body and having a base part-side coupled to the discharge part and a tip end-side coupled to the opening/closing control device arranged in a vicinity of the inflow opening,
the discharge part is configured so that, when the bag main body inflates in a state where a coupling of the coupling member with the opening/closing control device is kept, wall parts around the exhaust hole are crimped to each other, and a closed state of the exhaust hole is thus kept in a state where the discharge part is pulled in the bag main body, and when the bag main body inflates in a state where the coupling of the coupling member with the opening/closing control device is released, a pulled state of the discharge part into the bag main body is released, and the discharge part protrudes from the bag main body to open the exhaust hole, peripheral edges of a pair of peripheral wall constituting parts, which are formed of flexible sheet members and constitute a peripheral wall upon inflation, are joined to form the bag main body and the discharge part, discharge part forming portions, which constitute the discharge part, partially protrude in the peripheral wall constituting parts, respectively, the peripheral wall constituting parts have edge parts for peripheral wall formation and edge parts for discharge part formation formed to continue from the edge parts for peripheral wall formation, respectively, the edge parts for peripheral wall formation are joined to each other, and the edge parts for discharge part formation are joined to each other, and the discharge part has a tip end-side coupled to the coupling member, and an opening, which constitutes the exhaust hole, is formed in the discharge part, when the discharge part is pulled into the bag main body the exhaust hole is closer to the tip end-side of the discharge part than the exhaust hole is to seal parts of the discharge part which are crimped to each other, wherein when the discharge part is deployed flat: (i) the discharge part has a substantially triangular shape tapered toward the tip end-side where the discharge part is coupled to the coupling member and (ii) the opening which constitutes the exhaust hole has a substantially semicircular shape notched on a side of the triangle which is not coupled to the coupling member.

\* \* \* \* \*